(12) United States Patent
Iyer et al.

(10) Patent No.: US 10,936,219 B2
(45) Date of Patent: *Mar. 2, 2021

(54) CONTROLLER-BASED INTER-DEVICE NOTATIONAL DATA MOVEMENT SYSTEM

(71) Applicant: Dell Products L.P., Round Rock, TX (US)

(72) Inventors: Shyamkumar T. Iyer, Austin, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/395,902

(22) Filed: Apr. 26, 2019

(65) Prior Publication Data

US 2020/0341660 A1 Oct. 29, 2020

(51) Int. Cl.
*G06F 3/06* (2006.01)
*G06F 9/38* (2018.01)

(52) U.S. Cl.
CPC .......... *G06F 3/0631* (2013.01); *G06F 3/0619* (2013.01); *G06F 3/0655* (2013.01); *G06F 3/0673* (2013.01); *G06F 9/38* (2013.01)

(58) Field of Classification Search
CPC .... G06F 3/0631; G06F 3/0619; G06F 3/0655; G06F 3/0673; G06F 9/38
See application file for complete search history.

(56) References Cited

U.S. PATENT DOCUMENTS

| 5,592,666 A | 1/1997 | Perez | |
|---|---|---|---|
| 8,693,343 B2* | 4/2014 | Nakagawa | H04L 12/18 370/241 |
| 2004/0153479 A1* | 8/2004 | Mikesell | G06F 11/1096 |
| 2010/0318498 A1* | 12/2010 | Swarnakar | G06F 16/284 707/693 |

(Continued)

OTHER PUBLICATIONS

"Pointer (Computer Programming)—Wikipedia, The Free Encyclopedia," Mar. 31, 2019, 22 Pages, Wikimedia Foundation, Inc., https://en.wikipedia.org/wiki/Pointer_(computer_programming).

*Primary Examiner* — Adam M Queler
*Assistant Examiner* — Richard L Sutton
(74) *Attorney, Agent, or Firm* — Haynes and Boone, LLP

(57) ABSTRACT

A switch-based inter-device notational data movement system includes a first processing system in a first chassis that provides a first thread, a second processing system in a second chassis that provides a second thread, each of which are coupled to a memory system by a switch device. A controller device coupled to the switch device receives a data transfer communication from the first thread requesting to transfer data to the second thread. That data stored in a first portion of the memory system associated with the first thread in a memory fabric management database included in the switch device. The controller device then modifies notational reference information in the memory fabric management database to disassociate the first portion of the memory system and the first thread and associate the first portion of the memory system with the second thread, allowing the second thread to reference the data using request/respond operation.

20 Claims, 20 Drawing Sheets

(56) References Cited

U.S. PATENT DOCUMENTS

2011/0153908 A1* 6/2011 Schaefer ................. G06F 12/10
 711/5
2014/0365726 A1* 12/2014 Bennett ................. G06F 3/0659
 711/114
2017/0161520 A1* 6/2017 Lockhart, III ...... G06F 21/6263
2018/0373553 A1* 12/2018 Connor ............... G06F 9/45558
2019/0236001 A1* 8/2019 Patel .................... G06F 3/0644

* cited by examiner

CONTROLLER-BASED INTER-DEVICE NOTATIONAL DATA MOVEMENT SYSTEM

BACKGROUND

The present disclosure relates generally to information handling systems, and more particularly to the movement of data between information handling systems via notational techniques performed by a controller device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often operate to provide for the movement of data. For example, processor systems included in respective server devices may operate to provide respective virtual machines and/or other applications, and those virtual machines in the different server devices may include threads that transfer data to each other. The transfer of data between threads included on virtual machines provided by different server devices is relatively slow, consumes memory bandwidth, and/or introduces other data transfer inefficiencies known in the art.

Furthermore, traditional processing system/memory system combinations built on the paradigm that the processing system/memory system pair is "fast" and the networking system and storage system is "slow" are being rethought as networking system and storage system speeds catch up to the processing system/memory system pair. For example, memory fabrics such as, for example, Generation Z (Gen-Z) memory fabrics have been introduced to eliminate bottlenecks and increase efficiency in conventional systems via the unification of communication paths and simplification of software required for processing system/memory system communications. As would be understood by one of skill in the art in possession of the present disclosure, such memory fabrics extend the processing system/memory system byte-addressable load/store model to the entire system by decoupling the processing system/compute functionality from the memory system/media functionality, allowing processing systems and memory system to act as peers that communicate using the same language via simplified, high performance, low latency communication paths that do not incur the translation penalties and software overhead in conventional systems.

However, the inventors of the present disclosure have found that data transfer between threads included on virtual machines provided by different server devices and via such memory fabrics still suffer from inefficiencies. For example, a data transfer from a first thread included on a first virtual machine provided by a first server device to a second thread included in a second virtual machine provided by a second server device may include the first thread generating and transmitting a memory load instruction to a memory fabric requester associated with the processing system that provides the first virtual machine. In response to receiving that memory load instruction, the memory fabric requester will then transmit a memory fabric request to a memory fabric responder associated with the memory system. The memory fabric responder will then retrieve data that is being requested via the memory fabric request from the memory device(s) in the memory system, and transmit that data as a payload in a memory fabric response to the memory fabric requester. The memory fabric requester will then load the data in the memory fabric response into a first memory system utilized by the first processing system that provides the first virtual machine, which allows the first thread to transmit that data to the second thread. As such, data movement between threads included on virtual machines provided by different server devices and via a memory fabric requires several read, copy, transmit, and/or write operations that the inventors of the present disclosure have discovered are unnecessary.

The inventors of the present disclosure describe a switch-based inter-device notational data movement system in co-pending U.S. patent application Ser. No. 16/396,140, filed on Apr. 26, 2019, the disclosure if which is incorporated by reference herein in its entirety. That disclosure discusses a switch device that is configured to identify requests to transfer data between threads in different server devices via communications transmitted by the thread transferring that data and, in response, modifying notational reference information in order to disassociate a first portion of a memory system (which stores the data associated with the transfer request) and the first thread and associate the first portion of the memory system with the second thread, which allows the second thread to reference the data using request/respond operation. However, such switch devices must be relatively sophisticated, and perform functionality that may not be easily integrated into a conventional switch device provided in a conventional networked system.

Accordingly, it would be desirable to provide an improved inter-device data movement system

SUMMARY

According to one embodiment, an Information Handling System (IHS) includes a processing system; and a memory system that is coupled to the processing system and that includes instructions that, when executed by the processing system, cause the processing system to provide a memory fabric application controller engine that is configured to: receive, in a data transfer communication transmitted by a first thread that is provided by a first processing system that is included in a first chassis, a request to transfer data to a second thread that is provided by a second processing system that is included in a second chassis, wherein the data is stored in a first portion of a memory system that is associated with the first thread in a memory fabric management database that is included in a switch device that couples the first processing system and the second processing system to the memory system; and modify, in the memory fabric management database included in the switch device, notational reference information in order to disassociate the first portion of the memory system and the first thread and associate the first portion of the memory system with the second thread, wherein the association of the first portion of the memory system with the second thread allows the second thread to reference the data using request/respond operation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
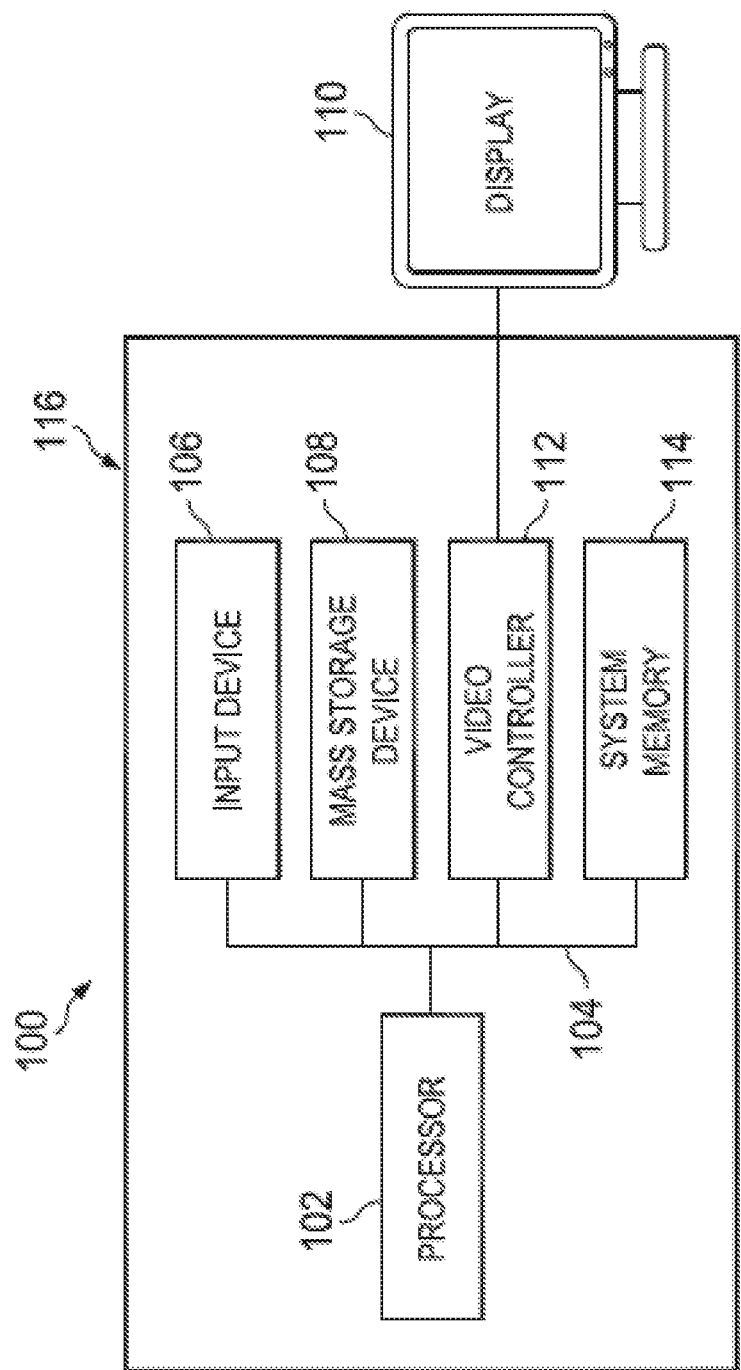
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
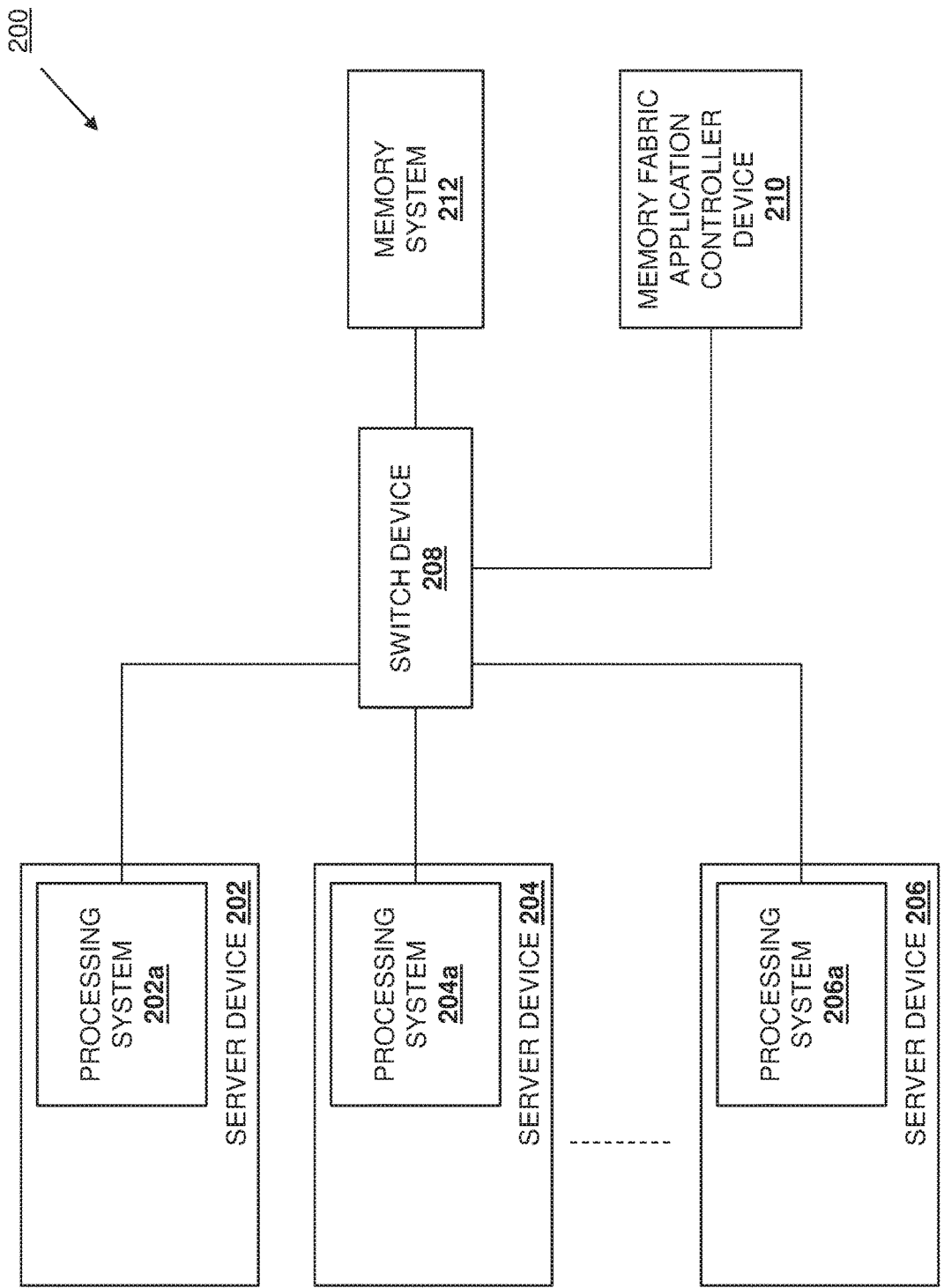
FIG. 2 is a schematic view illustrating an embodiment of a networked system that may provide the controller-based inter-device notational data movement system of the present disclosure.

Referring now to FIG. 2, an embodiment of a networked system 200 is illustrated. In the illustrated embodiment, the networked system 200 incudes a plurality of server devices 202, 204, and 206. In an embodiment, any or all of the server devices 202, 204, and 206 may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202, 204, and 206 provided in the networked system 200 may include any devices that may be configured to operate similarly as discussed below. While only three server devices 202, 204, and 206 are illustrated and discussed below, one of skill in the art in possession of the present disclosure will recognize that many more server devices may (and typically will) be provided in the networked system 200 (e.g., a datacenter) while remaining within the scope of the present disclosure. In the illustrated embodiment, each of the server devices 202, 204, and 206 includes a respective processing system 202a, 204a, and up to 206a. While not illustrated, each of the processing system 202a, 204a, and up to 206a may be coupled to respective local memory systems that are provided in their respective server devices 202, 204, and 206, and that include instructions that, when executed by the respective processing systems 202a, 204a, and up to 206a, allow the processing systems 202a, 204a, and up to 206a to perform any of the functionality discussed below (e.g., the provisioning of virtual machines, applications, threads, etc.)

In the Illustrated embodiment, the server devices 202, 204, and 206 are each coupled to a switch device 208 (e.g., via a network 204 that may be provided in the networked system 200 by, for example, a Local Area Network (LAN), the Internet, and/or any other network (or combination of networks) that would be apparent to one of skill in the art in possession of the present disclosure.) In an embodiment, the switch device 208 may be provided by the IHS 100 discussed above with reference to FIG. 1, and/or may include some or all of the components of the IHS 100. However, while discussed herein as being a switch device, one of skill in the art in possession of the present disclosure will recognize that the switch device 208 may be replaced with a bridge device and/or other devices with similar functionality while remaining within the scope of the present disclosure as well. In the illustrated embodiment, the switch device 208 is coupled to a memory fabric application controller device 210, which may be provided by the IHS 100 discussed above with reference to FIG. 1, and/or may include some or all of the components of the IHS 100. As discussed below, the switch device 208 may be provided by a Gen-Z switch device and may operate with the memory fabric application controller device 210 in order to provide the controller-based inter-device notational data movement functionality discussed below.

Furthermore, the illustrated embodiment of the networked system 200 includes a memory system 212 that is coupled to the server devices 202, 204, and 206 via the switch device 208. In an embodiment, the memory system 212 may be provided by the IHS 100 discussed above with reference to FIG. 1, and/or may include some or all of the components of the IHS 100. In specific examples, the memory system 212 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 212 provides a network-connected memory fabric that may be utilized by any of the server devices 202, 204, and 206 via the switch device 208.

For example, the network-connected memory fabric may be a Generation Z (Gen-Z) memory fabric created and commercialized by the Gen-Z consortium, which one of skill in the art in possession of the present disclosure will recognize extends the processing system/memory system byte-addressable load/store model to the entire networked system 200 by decoupling the processing system/compute functionality in the server devices 202, 204, and 206 from the memory system/media functionality in the memory system 212, allowing processing systems and memory systems to act as peers that communicate using the same language via simplified, high performance, low latency communication paths that do not incur the translation penalties and software overhead in conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, the server devices 202, 204, and 206 are illustrated as each coupled to the memory system 212 via the switch device 208, one of skill in the art in possession of the present disclosure will recognize that in other embodiments the switch device 208, the memory fabric application controller device 210, and the memory system 212 may be provided in a server device to enable the functionality described below while remaining within the scope of the present disclosure as well. As such, while a specific networked system 200 has been illustrated and described, one of skill in the art in possession of the present disclosure will recognize that the controller-based inter-device notational data movement system of the present disclosure may utilize a variety of other components and component configurations while remaining within the scope of the present disclosure as well.

Figure 3:
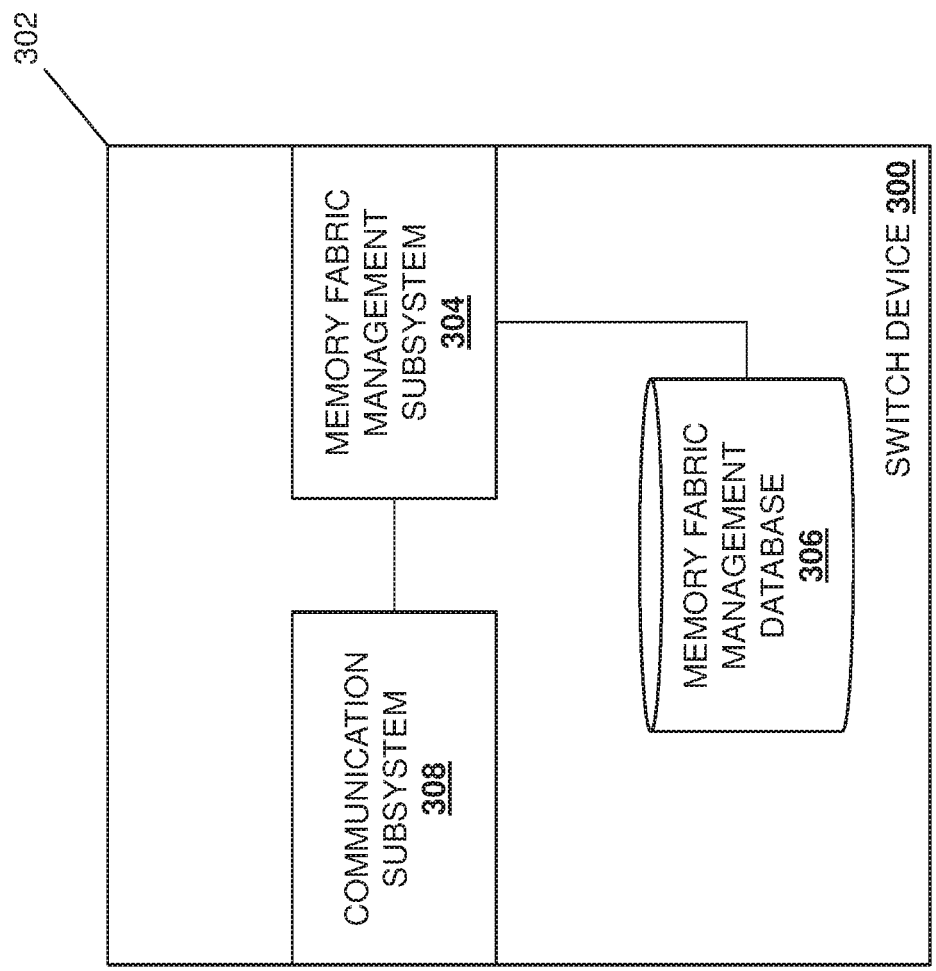
FIG. 3 is a schematic view illustrating an embodiment of a switch device that may be included in the networked system of FIG. 2.

Referring now to FIG. 3, an embodiment of a switch device 300 is illustrated that may provide the switch device 208 discussed above with reference to FIG. 2. As such, the switch device 300 may be provided by the IHS 100 discussed above with reference to FIG. 1 and/or may include some or all of the components of the IHS 100, and in specific examples may be provided by a Gen-Z switch device as discussed above. Furthermore, while illustrated and discussed as a switch device 300, one of skill in the art in possession of the present disclosure will recognize that the functionality of the switch device 300 discussed below may be provided by other devices (e.g., the bridge devices discussed above) that are configured to operate similarly as discussed below. In the illustrated embodiment, the switch device 300 includes a chassis 302 that houses the components of the switch device 300, only some of which are illustrated below. In the illustrated embodiment, the chassis 302 houses a memory fabric management subsystem 304 that is configured to provide memory fabric management operations for the switch device 300.

For example, when the memory fabric is a Gen-Z memory fabric as discussed above, the memory fabric management subsystem 304 may include a Gen-Z Memory Management Unit (Gen-Z ZMMU) that, in the example provided below, operates to enable access for the processing systems 202a, 204a, and 206a of FIG. 2 to the Gen-Z memory fabric by augmenting the Gen-Z ZMMU requester operations, and may operate to manage all the Gen-Z ZMMUs in the system. In some specific examples, the switch device 300 may operate to hide the hierarchy of Gen-Z ZMMUs behind it by, for example, operating as a Gen-Z ZMMU requester and a Gen-Z ZMMU responder. As such, when the Gen-Z ZMMU(s) provided by the switch device 300 have been programmed, each server device 202, 204, and 206 may discover Gen-Z memory fabric access (e.g., via a Gen-Z aperture) during the boot process, and map ZMMU memory space aperture(s) into their system physical address space, and the BIOS, firmware, and operating system in each of those server devices may perform the ZMMU address space discovery. Following that discovery, the operating system may implement a memory manager using a CPU MMU in order to allocate memory using MMU page size chunks for applications (i.e., the ZMMU aperture may be allocated by the memory fabric management subsystem 304, with the individual MMU pages allocated to the application(s) by server device operating systems). However, one of skill in the art in possession of the present disclosure will recognize that other memory fabric management subsystems for other memory fabrics may be utilized with the teachings of the present disclosure while remaining within its scope as well.

The chassis 302 may also house a storage system (not illustrated, but which may include the storage 108 discussed above with reference to FIG. 1) that is coupled to the memory fabric management subsystem 304 (e.g., via a coupling between the storage system and the memory fabric management subsystem 304) and that includes a memory fabric management database 306 that is configured to store any of the information (e.g., the memory fabric reference pointers, memory fabric page ownership information, etc.) utilized by the memory fabric management subsystem 304 discussed below. In the illustrated embodiment, the chassis 302 also houses a communication subsystem 308 that is coupled to the memory fabric management subsystem 304 and that may be provided by a Network Interface Controller (NIC), wireless communication components (e.g., Wifi components, BLUETOOTH components, Near Field Communication (NFC) components, etc.), and/or any other communication subsystems that would be apparent to one of skill in the art in possession of the present disclosure. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
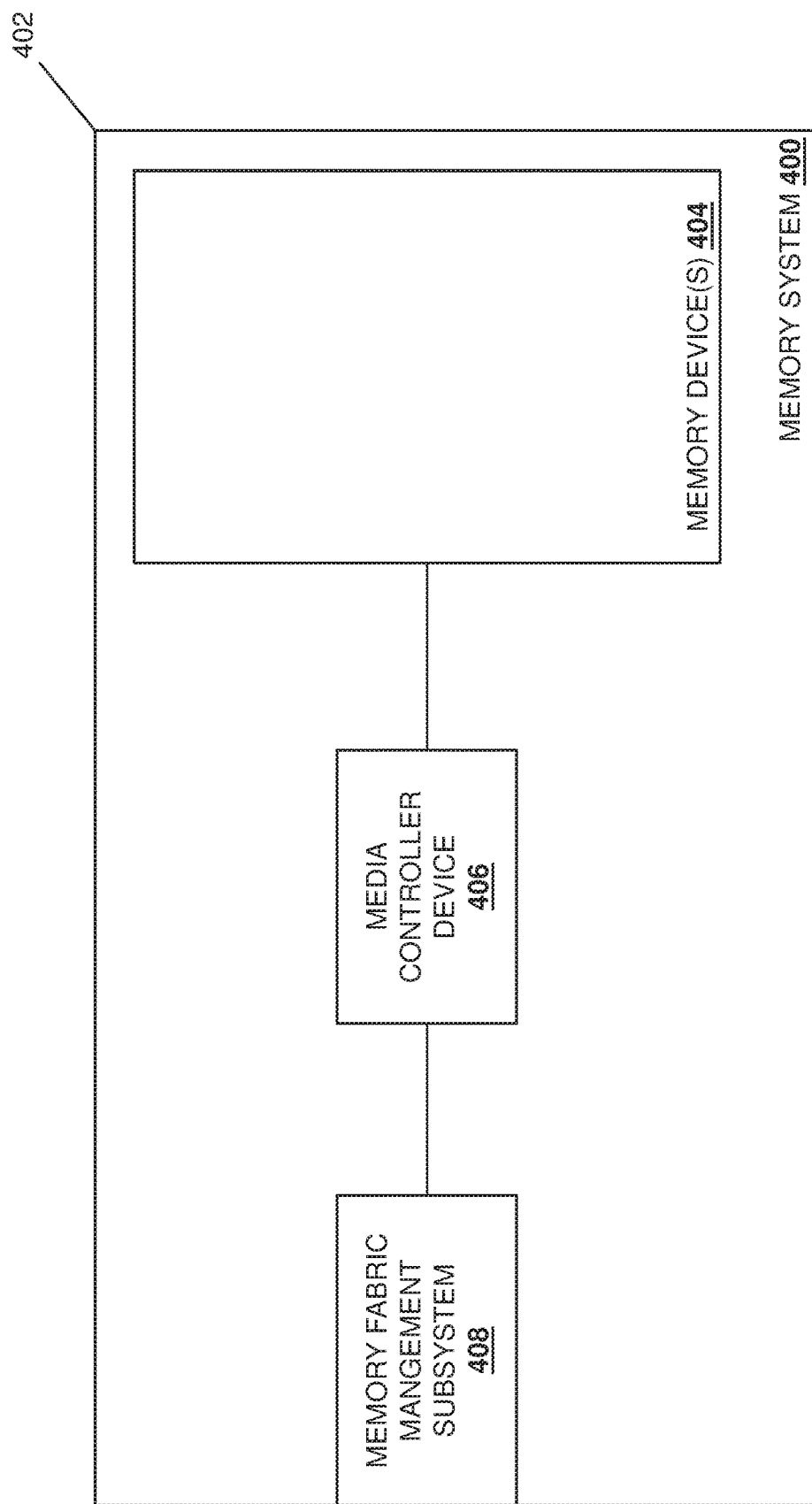
FIG. 4 is a schematic view illustrating an embodiment of a memory system that may be included in the networked system of FIG. 2.

Referring now to FIG. 4, an embodiment of a memory system 400 is illustrated that may provide the memory system 212 discussed above with reference to FIG. 2. As such, the memory system 400 may be provided by the IHS 100 discussed above with reference to FIG. 1 and/or may include some or all of the components of the IHS 100, and in specific examples may be provided by one or more separate server devices, one or more of the server devices 202, 204, and 206, and/or in a variety of other manners that would be apparent to one of skill in the art in possession of the present disclosure. Furthermore, while illustrated and discussed as a memory system, one of skill in the art in possession of the present disclosure will recognize that the functionality of the memory system discussed below may be provided by other devices that are configured to operate similarly as discussed below. In the illustrated embodiment, the memory system 400 includes a chassis 402 that houses the components of the memory system 400, only some of which are illustrated below.

For example, the chassis 402 may house one or more memory devices 404 that may be provided by Dynamic Random Access Memory (DRAM) devices, Storage Class Memory (SCM) devices, Solid State Drive (SSD) device arrays, and/or any other memory device that would be apparent to one of skill in the art in possession of the present disclosure. In the illustrated embodiment, the chassis 402 houses a media controller device 406 that is coupled to the memory device(s) 404. While illustrated as a single media controller device 406 coupled to one or more memory device(s) 404, one of skill in the art in possession of the present disclosure will recognize that multiple media controller devices may be provided for the memory device(s) 404 while remaining within the scope of the present disclosure as well. For example, a separate media controller device may be provided for each memory device technology (e.g., a first media controller device may be provided for DRAM devices, a second media controller device may be provided for SCM devices, etc.) However, while a few specific examples of memory devices and media controller devices have been provided, one of skill in the art in possession of the present disclosure will recognize that a wide variety of memory device and/or media controller device components and/or configurations will fall within the scope of the present disclosure as well.

In the illustrated embodiment, the chassis 402 houses a memory fabric management subsystem 408 that is configured to provide memory fabric management operations for the memory system 400. For example, when the memory fabric is a Gen-Z memory fabric as discussed above, the memory fabric management subsystem 408 may include a Gen-Z Memory Management Unit (Gen-Z ZMMU) that, in the example provided below, operates as a Gen-Z ZMMU responder that operates with Gen-Z ZMMU requester(s) that provide access for the processing systems 202*a*, 204*a*, and 206*a* to the Gen-Z memory fabric. However, one of skill in the art in possession of the present disclosure will recognize that other memory fabric management subsystems for other memory fabrics may be utilized with the teachings of the present disclosure while remaining within its scope as well. While a specific memory system 400 has been illustrated, one of skill in the art in possession of the present disclosure will recognize that memory systems (or other systems operating according to the teachings of the present disclosure in a manner similar to that described below for the memory system 400) may include a variety of components and/or component configurations for providing conventional memory system functionality, as well as the functionality discussed below, while remaining within the scope of the present disclosure as well.

Figure 5:
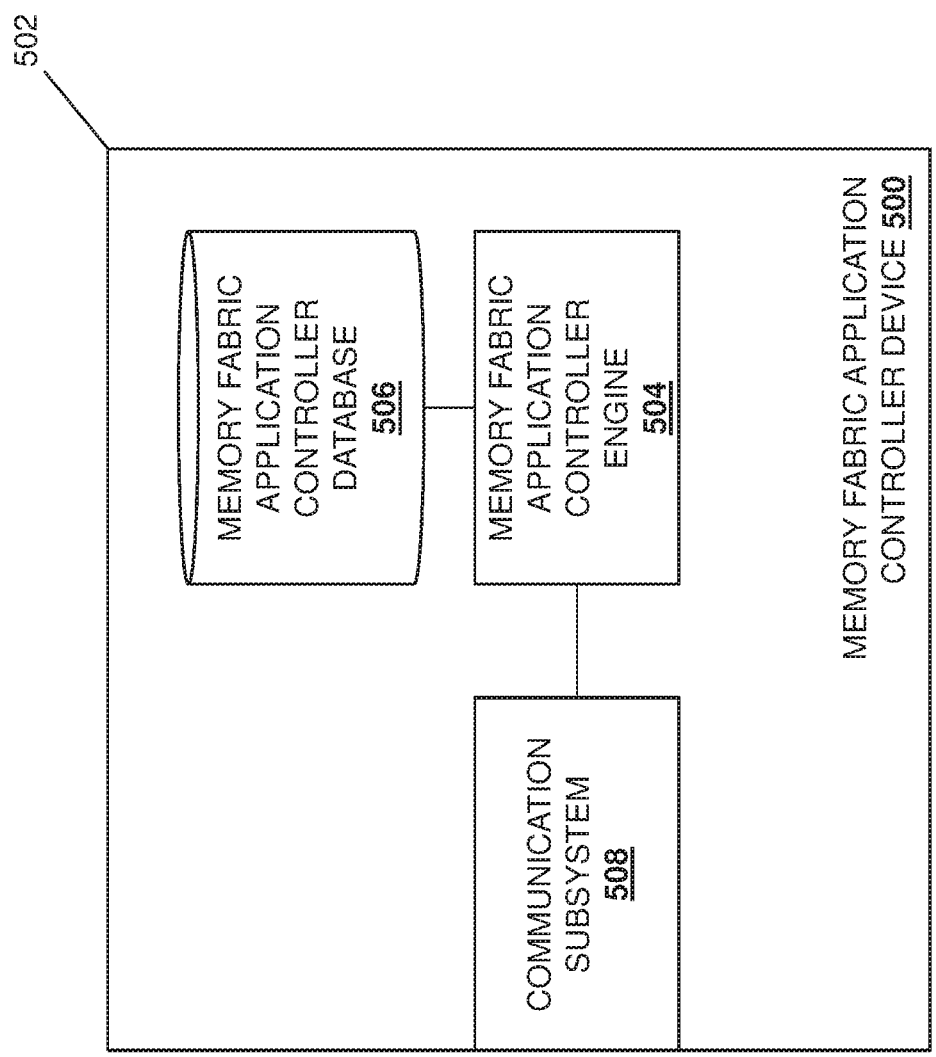
FIG. 5 is a schematic view illustrating an embodiment of a memory fabric application controller device that may be included in the networked system of FIG. 2.

Referring now to FIG. 5, an embodiment of a memory fabric application controller device 500 is illustrated that may provide the memory fabric application controller device 210 discussed above with reference to FIG. 2. As such, the memory fabric application controller device 500 may be provided by the IHS 100 discussed above with reference to FIG. 1 and/or may include some or all of the components of the IHS 100, and in specific examples may operate with a Gen-Z switch device as discussed above. Furthermore, while illustrated and discussed as a memory fabric application controller device 500, one of skill in the art in possession of the present disclosure will recognize that the functionality of the memory fabric application controller device 500 discussed below may be provided by other devices that are configured to operate similarly as discussed below. In the illustrated embodiment, the memory fabric application controller device 500 includes a chassis 502 that houses the components of the memory fabric application controller device 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a memory fabric application controller engine 504 that is configured to perform the functionality of the memory fabric application controller engines and memory fabric application controller devices discussed below. In some of the embodiments discussed below, the memory fabric application controller engine 504 may act as a Gen-Z message controller appliance that performs memory allocation/mapping for applications (e.g., the threads 700*a* and 702*a* included on the virtual machines 700 and 702) utilizing a Gen-Z memory fabric, thus operating similar to an operating system that allocates memory fabric resources for applications via its knowledge of memory page requirements in the memory system 212, and with the ability to optimize page table translations to provide for minimal data copy operations.

The chassis 502 may also house a storage system (not illustrated, but which may include the storage 108 discussed above with reference to FIG. 1) that is coupled to the memory fabric application controller engine 504 (e.g., via a coupling between the storage system and the processing system) and that includes a memory fabric application controller database 506 that is configured to store any of the information utilized by the memory fabric application controller engine 504 discussed below. In the illustrated embodiment, the chassis 502 also houses a communication subsystem 508 that is coupled to the memory fabric application controller engine 504 and that may be provided by a Network Interface Controller (NIC), wireless communication components (e.g., Wifi components, BLUETOOTH components, Near Field Communication (NFC) components, etc.), and/or any other communication subsystems that would be apparent to one of skill in the art in possession of the present disclosure. While a specific memory fabric application controller device 500 has been illustrated, one of skill in the art in possession of the present disclosure will recognize that memory fabric application controller devices (or other devices operating according to the teachings of the present disclosure in a manner similar to that described below for the memory fabric application controller device 500) may include a variety of components and/or component configurations for providing the functionality discussed below while remaining within the scope of the present disclosure as well.

Figure 6:
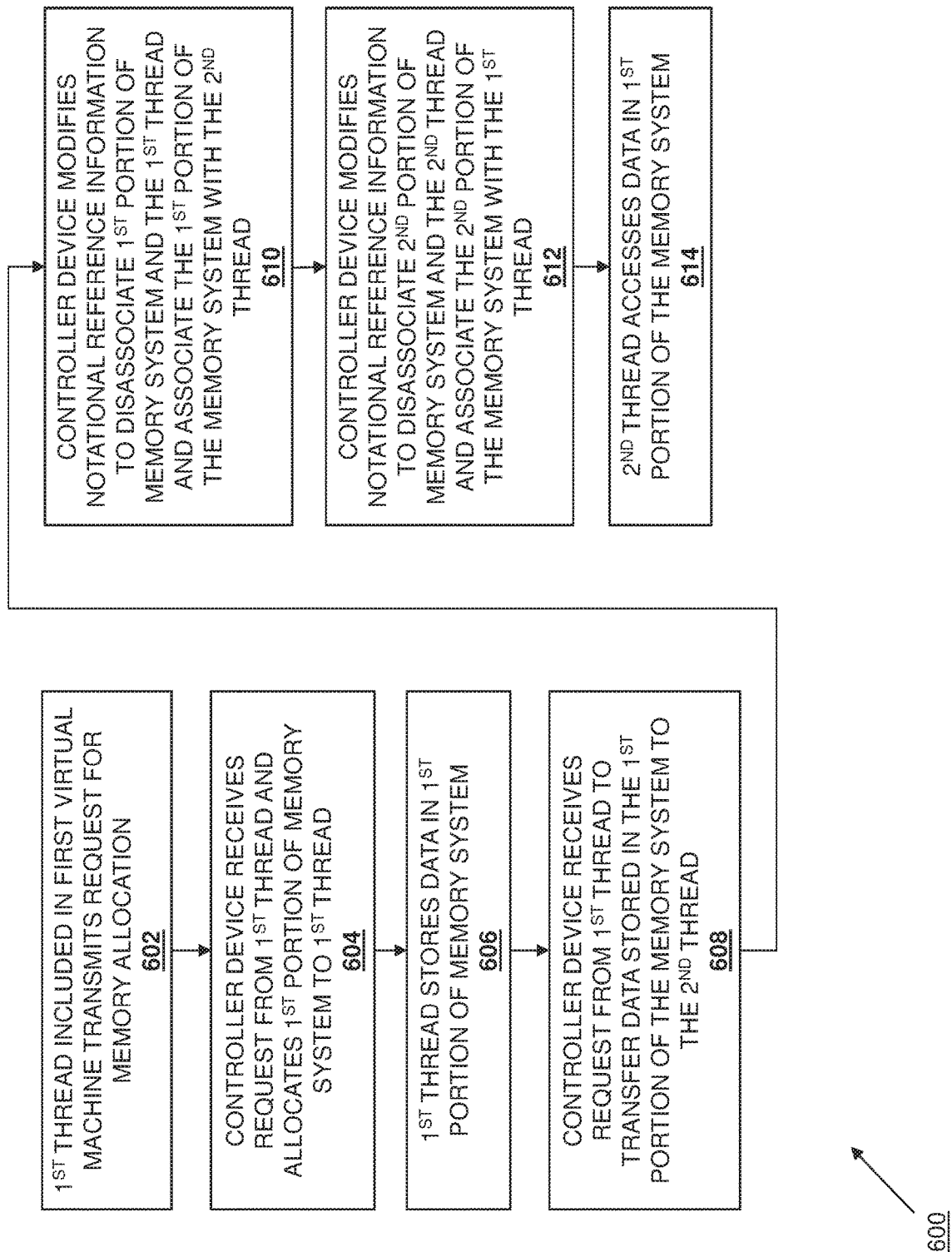
FIG. 6 is a flow chart illustrating an embodiment of a method for providing controller-based inter-device notational data movement.

Referring now to FIG. 6, an embodiment of a method for providing inter-device notational data movement is illustrated. As discussed below, the systems and methods of the present disclosure provide for the "transfer" of data while avoiding the need to perform read, write, copy, and/or other conventional data transfer operations that actually move data between memory fabric address spaces by changing the allocations of portions of a memory system in a memory fabric between a thread that requests to transfer that data and a thread to which the transfer of that data was requested. For example, a first thread included in a first virtual machine provided by a first processing system in a first server device may request to transfer data to a second thread included in a second virtual machine provided by a second processing system in a second server device, and a switch device provided between those threads and a memory fabric memory system may forward that request to transfer data to a controller device. In response, the controller device modifies notational reference information in a database included in the switch device in order to disassociate the first portion of the memory fabric memory system and the first thread and associate the first portion of the memory fabric memory system with the second thread, which allows the second thread to reference that data in the memory fabric memory system using request/respond operations. As such, more efficient controller-based inter-device memory-fabric-based data transfers are provided that eliminate the need to perform conventional data transfer operations that actually move the data between memory fabric address spaces, while also eliminating the need for specialized switch devices and instead providing the effect of such data movement via a controller device that modifies notational reference information stored in a switch device in order to reallocate portions of the memory fabric.

Figure 7:
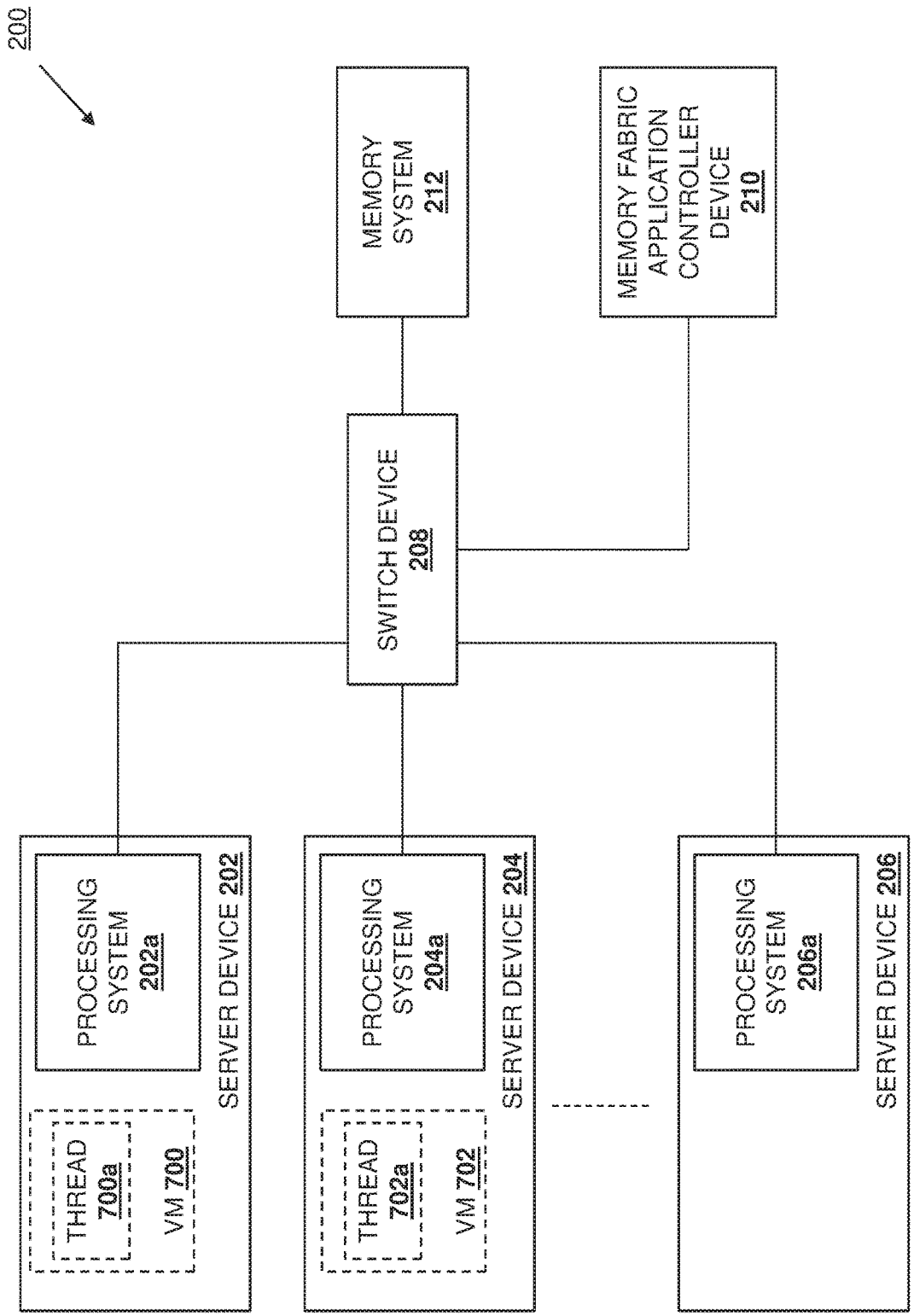
FIG. 7 is a schematic view illustrating an embodiment of server devices in the networked system of FIG. 2 operating during the method of FIG. 6.

The method 600 begins at block 602 where a first thread included in a first virtual machine transmits a request for memory allocation. In an embodiment, at or before block 602, any or all of the processing systems 202*a*, 204*a*, and/or 206*a* in their respective server devices 202, 204, and/or 206 may operate to provide a virtual machine or other application (e.g., via the execution of instructions on a local memory system to which they are connected), and as would be understood by one of skill in the art in possession of the present disclosure, those virtual machines/applications may include threads or other virtual machine/application components that are configured to utilize portions of a memory fabric memory system similarly as discussed below. With reference to FIG. 7 and for the purposes of the examples provided below, the processing system 202*a* in the server device 202 is illustrated as providing a Virtual Machine (VM) 700 (e.g., via the execution of instructions included on a local memory system) that incudes a thread 700*a*, and the processing system 204*a* in the server device 204 is illustrated as providing a Virtual Machine (VM) 702 (e.g., via the execution of instructions included on a local memory system) that incudes a thread 702*a*. However, while two virtual machines including respective threads are illustrated, one of skill in the art in possession of the present disclosure will recognize that any number of virtual machines and their threads may be provided while remaining within the scope of the present disclosure as well.

Figure 8A:
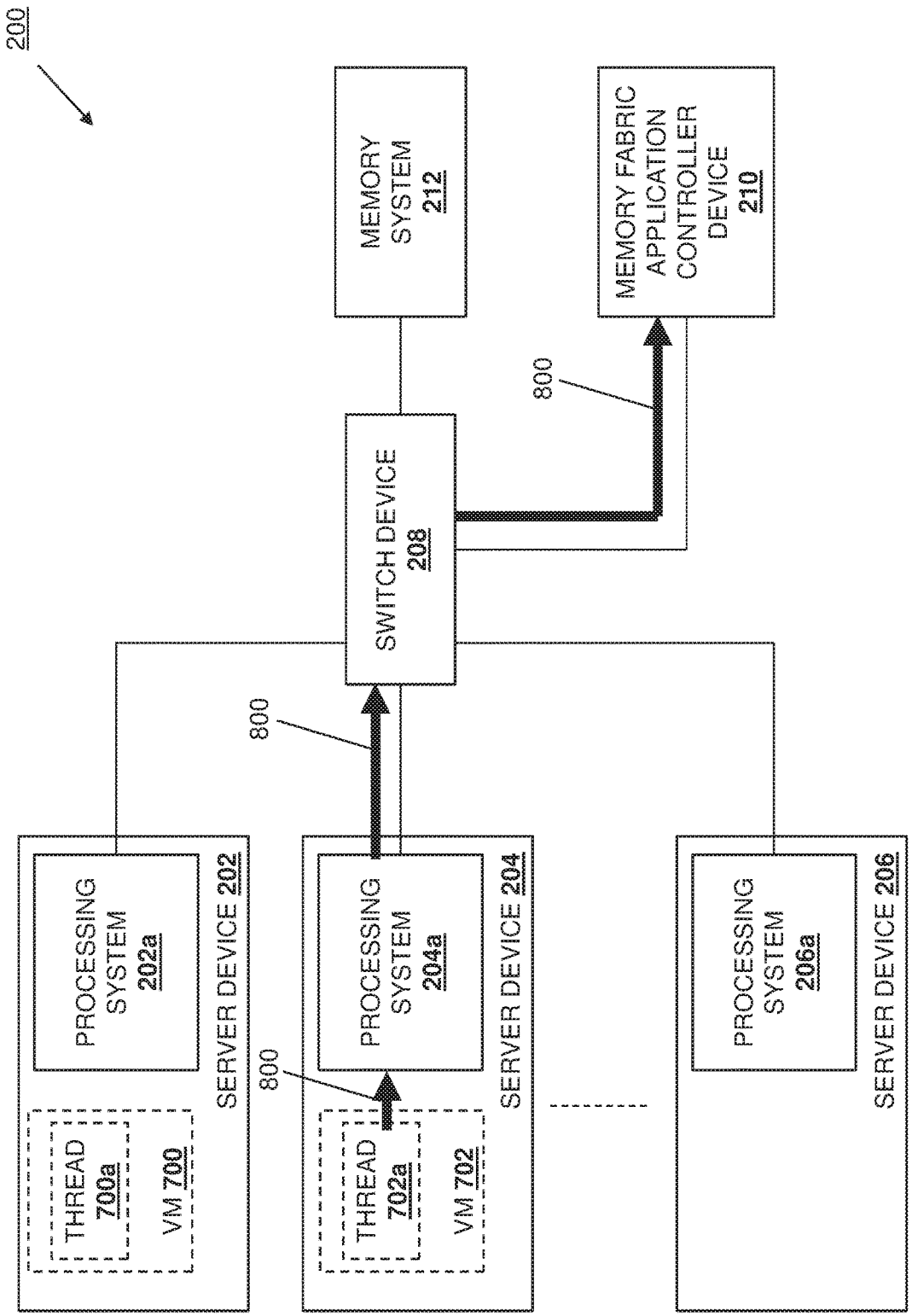
FIG. 8A is a schematic view illustrating an embodiment of the controller-based inter-device notational data movement system in the networked system of FIG. 2 operating during the method of FIG. 6.

As such, at block 602, threads included in any virtual machines provided on any of the server devices 202, 204, and 206 may transmit a request for memory allocation to the switch device 208. With reference to FIG. 8A, the thread 702*a* is illustrated as generating and transmitting a request 800 for memory allocation via its processing system 204 and to the switch device 208. In some embodiments, the request for memory allocation may be sent at block 602 following a power on, reset, reboot, and/or other initialization of the server device 204. However, one of skill in the art in possession of the present disclosure will recognize that memory allocations and memory allocation requests may occur during a variety of times that will fall within the scope of the present disclosure as well. In an embodiment and as discussed in further detail below, the thread 702*a* is requesting a memory allocation from the external memory fabric application controller device 210 and, after the memory request is satisfied, an application providing the thread 702*a* may perform load stores to it. As such, memory may be allocated by the external memory fabric application controller device 210 on demand using fabric memory allocation APIs that applications/threads may incorporate to request memory on demand.

In a specific example, the code for providing the request 800 for the memory allocation at block 602 may include code such as "Buf=Fabric_Malloc(context_ID_A, size, type)", which one of skill in the art in possession of the present disclosure will recognize includes a request for the allocation of a portion of the memory fabric that identifies a size of the portion of the memory fabric being requested for allocation, a type of memory being requested for allocation, and a context that identifies to the external memory fabric application controller device which server device, virtual machine within a server device, or thread provided by a virtual machine within a server device is requesting the memory allocation. However, while a specific example of a memory allocation request is described, one of skill in the art in possession of the present disclosure will recognize that memory allocations may be requested in a variety of manners that will fall within the scope of the present disclosure as well.

The method 600 then proceeds to block 604 where a controller device receives the request from the first thread and allocates a first portion of a memory system to the first thread. In an embodiment, at block 604, the memory fabric application controller device 212 may receive the request for the memory allocation transmitted at block 502. For example, with reference to FIG. 8A, at block 604 the memory fabric management subsystem 304 in the switch device 300 may identify the request 800 for memory allocation that was received via its communication subsystem 308, and may then forward that request 800 for memory allocation through the communication subsystem 308 to the memory fabric application controller device 212. As such, at block 604, the memory fabric application controller engine 504 in the memory fabric application controller device 500 may receive the request 800 for memory allocation via its communication subset 508.

Figure 8B:
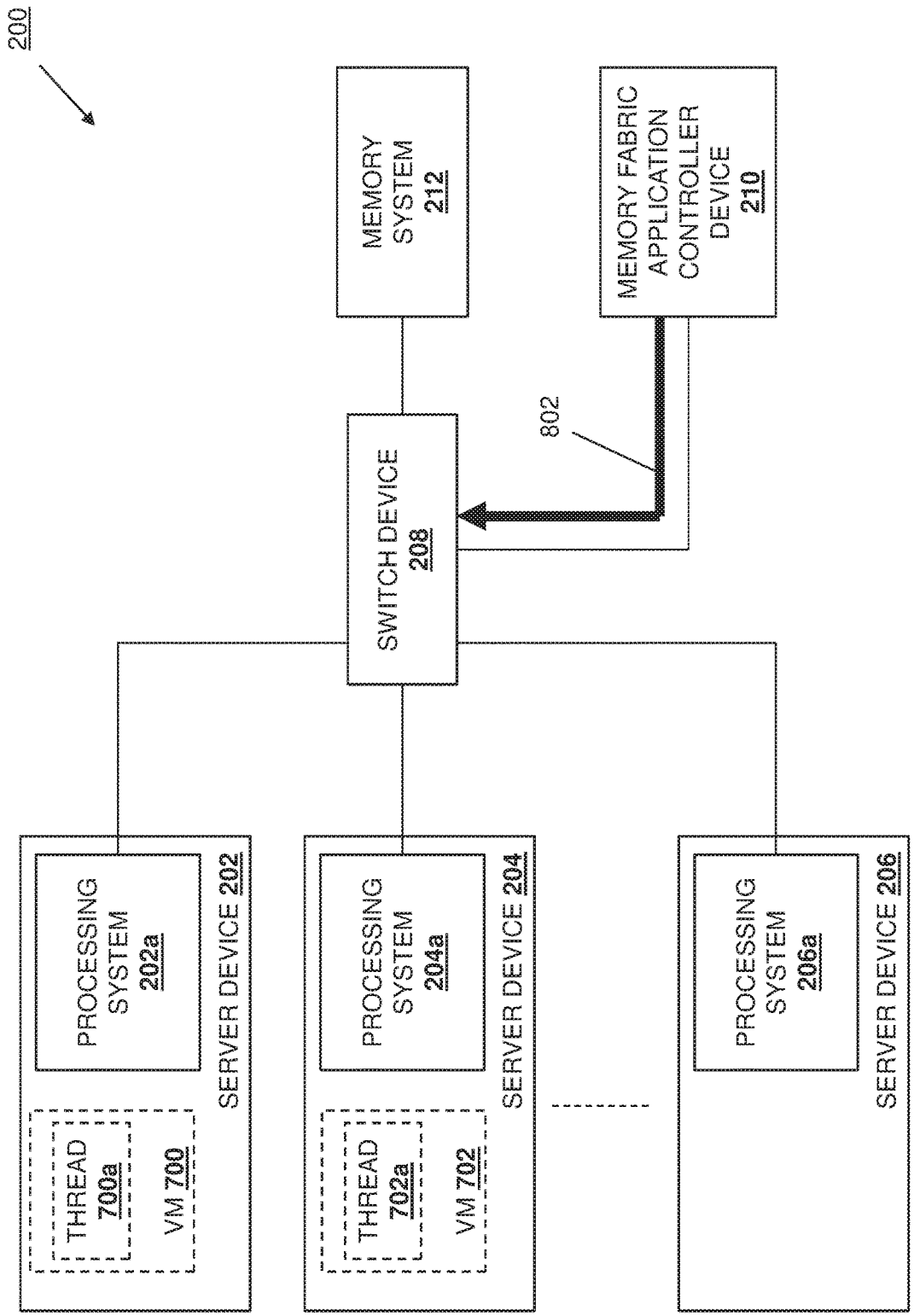
FIG. 8B is a schematic view illustrating an embodiment of the controller-based inter-device notational data movement system in the networked system of FIG. 2 operating during the method of FIG. 6.

In response to receiving the request from the first thread, the controller device may operate to identify a portion of the memory system 212 for allocation to that first thread. For example, the memory fabric application controller engine 504 in the memory fabric application controller device 500 may identify any information received in the request 800 for memory allocation (e.g., the requested memory size, the requested memory type, and attributes such a MAP_SHARED, MAP_PRIVATE, MAP_EXLUSIVE, MAP_CACHEABLE, MAP_CONTIGUOUS, and/or other attributes known in the art), may access the memory fabric application controller database 506 and utilized any information about the networked system 200 included therein, and/or may utilize any other information that would be apparent to one of skill in the art in possession of the present disclosure in order to identify the portion of the memory system 212 for allocation to that thread 702*a*. With reference to FIG. 8B, the memory fabric application controller engine 504 in the memory fabric application controller device 500 may then operate to allocate portions of the memory system 212 to the thread 702*a* by, for example, performing a memory fabric allocation update 802 that provides notational reference information (via its communication subsystem 508) to the switch device 208 such that memory fabric management subsystem 304 in the switch device 208/300 receives that notational reference information (via its communication subsystem 308) and provides it in the memory fabric management database 306.

In embodiments in which the memory fabric is a Gen-Z memory fabric, the memory fabric allocation update 802 may be provided by a Gen-Z Memory Management Unit (Gen-Z ZMMU) mapping update that operates to update mappings between threads included in virtual machines provided by the server devices 202, 204, and 206, and portions of the memory system 212. However, one of skill in the art in possession of the present disclosure will recognize the allocations of other memory fabrics via other techniques will fall within the scope of the present disclosure as well. In some embodiments, the memory fabric allocation update 802 may cause the memory fabric management subsystem 304 in the switch device 300 to communicate with the memory fabric management subsystem 408 in the memory system 212/400 via its communication subsystem 308 in order to cause the media controller device 406 to provide allocations of memory system address space included in the memory device(s) 404 to the thread 702*a*

In a specific example, Gen-Z ZMMUs may provide Gen-Z apertures for pages in the memory fabric that operate essentially as a page directory for the memory fabric that is managed/programmed by the memory fabric manager and advertised using the Gen-Z apertures, specific memory fabric resources, and memory regions. Furthermore, once mapped and advertised to a server device, the server device may discover the memory as part of its normal boot memory discovery process (e.g., using firmware and via an e820/ACPI table map) and provide its address region in the server devices physical address space map, which allows that memory to be discovered by its operating system. The operating system memory manager will then allocate one or more virtual machine threads from various regions within the system physical address space, including the spaces discovered via the Gen-Z ZMMU apertures Furthermore, the memory fabric management subsystem 304 in the switch device 300 may store the notational reference information provided by the memory fabric application controller device 210 about memory system portion allocations in the memory fabric management database 306, which may include, for example, reference pointers that map the first thread to a first portion of the memory system 210/400, page ownership information that provides the first thread ownership of the first portion of the memory system 210/400, and/or any other notational reference information that would be recognized by one of skill in the art in possession of the present disclosure as providing for the allocation of portions of a memory fabric memory system to threads With reference to FIG. 8C and for the purposes of the examples provided below, the thread 702*a* is illustrated as having been allocated a second thread memory space 806 (e.g., by the media controller device 406 in response to the communications between the memory fabric management subsystem 304 and the memory fabric management subsystems 408 as discussed above). As would be appreciated by one of skill in the art in possession of the present disclosure, the second thread memory space 606 may be defined by memory address ranges provided by the memory device(s) 404, memory pages provided by the memory device(s) 404, and/or other different portions of the memory device(s) 404 that would be apparent to one of skill in the art in possession of the present disclosure. FIG. 8D illustrates how the switch device 208 may provide a memory allocation confirmation 808 to the thread 702*a*. For example, upon allocation of the portion of the memory system 212 to the thread 702*a*, the memory fabric management subsystem 304 may generate and transmit the memory allocation confirmation 808 via its communication subsystem 308 and to the server device 204 such that it is received by the thread 702a included in the virtual machine 702 via its processing system 204a.

Figure 8C:
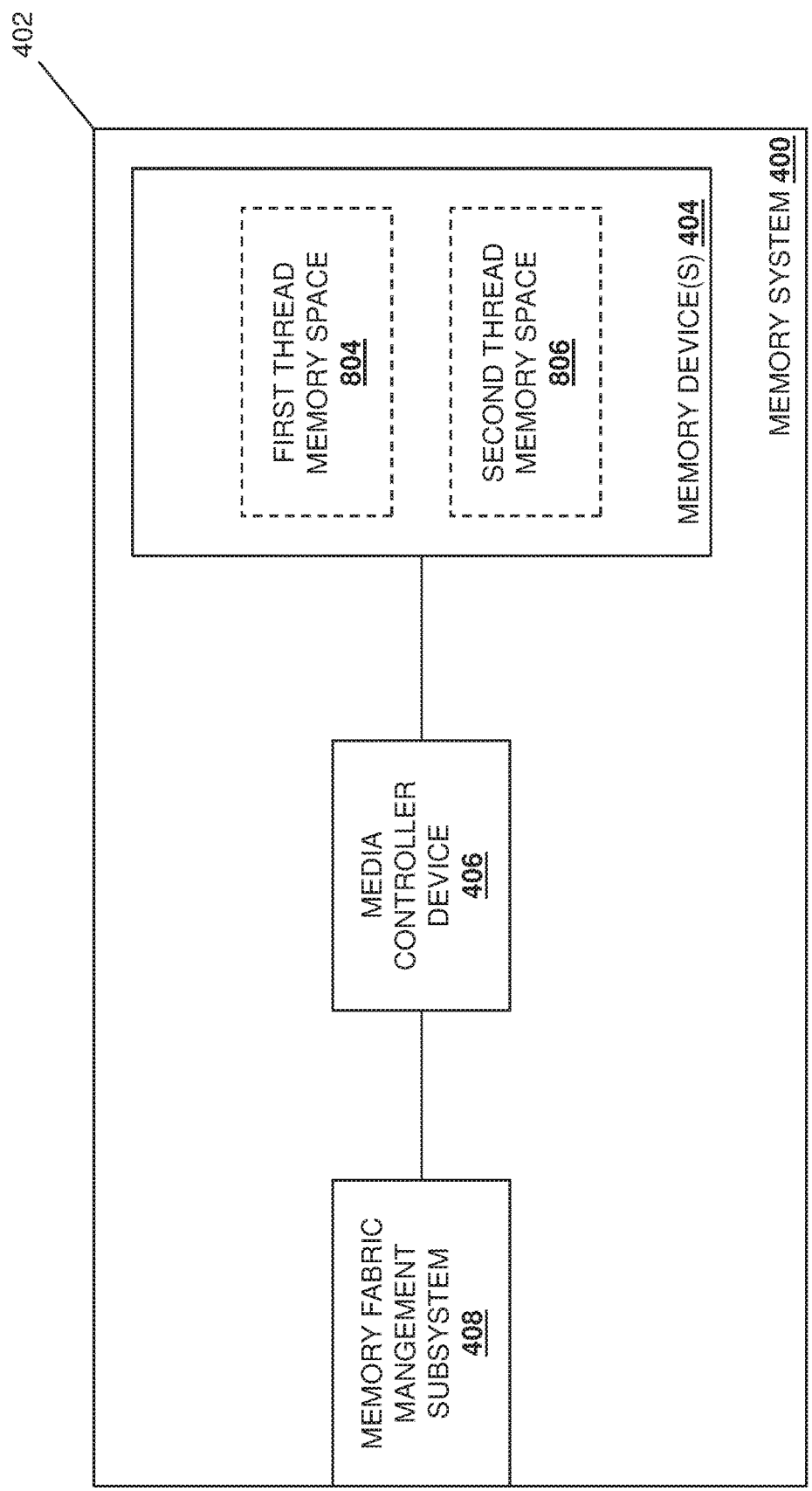
FIG. 8C is a schematic view illustrating an embodiment of the memory system of FIG. 4 operating during the method of FIG. 6.
Figure 8D:
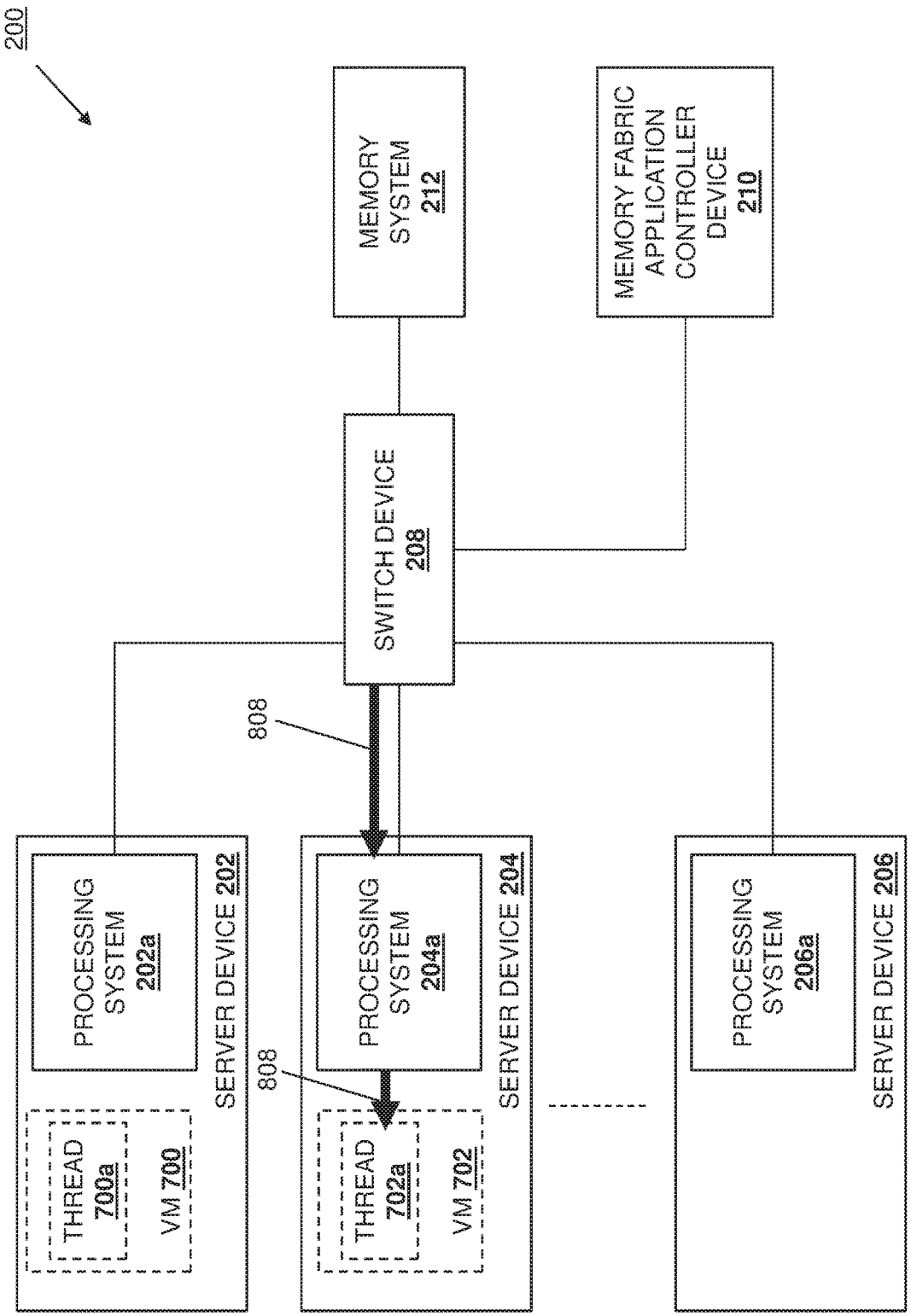
FIG. 8D is a schematic view illustrating an embodiment of the controller-based inter-device notational data movement system in the networked system of FIG. 2 operating during the method of FIG. 6.

FIG. 8C also illustrates how a second thread memory space 806 in the memory device(s) 404 may be allocated to a thread included in a virtual machine provided by any of the server devices 202, 204, and 206 via, for example, the techniques described above and/or using any other memory fabric allocation techniques that would be apparent to one of skill in the art in possession of the present disclosure. In the examples provided below, the second thread memory space 806 in the memory device(s) 404 is allocated to the thread 700a, and the first thread memory space 804 and the second thread memory space 806 are equal size memory spaces. However, one of skill in the art in possession of the present disclosure will recognize that threads may be allocated different size memory spaces, and the discussion of equal size memory spaces below applies to particular embodiments of the present disclosure. In particular, the portion of the memory system 400 allocated to the thread 702a may be larger than the second thread memory space 806, with the second memory thread space 806 providing a subset of that portion of the memory system 400 allocated to the thread 702a that stores the data being "transferred" during the method 600.

Figure 9A:
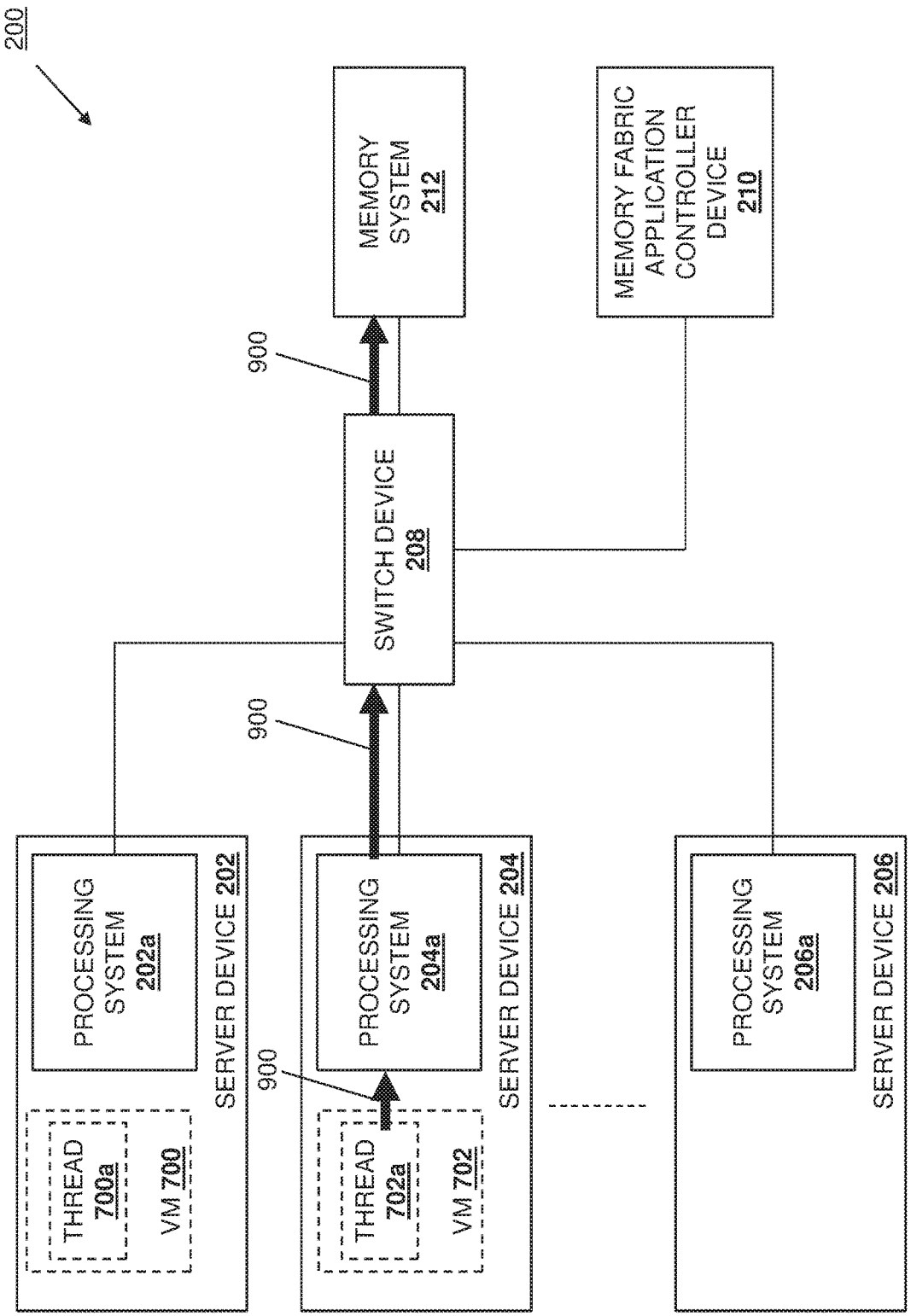
FIG. 9A is a schematic view illustrating an embodiment of the controller-based inter-device notational data movement system in the networked system of FIG. 2 operating during the method of FIG. 6.

The method 600 then proceeds to block 606 where the first thread stores data in the first portion of the memory system. In an embodiment, at block 606, any thread allocated a portion of the memory system 212 may store data in that portion of the memory system 212. For example, FIG. 9A illustrates the thread 702a generating and transmitting a data load/store communication 900 and transmitting that data load/store communication via its processing system 204a to the switch device 208. In a specific example, code that provides the data load/store communication 900 may include "writel(buf, val); Memcpy(new_buf, buf,count);", which one of skill in the art in possession of the present disclosure will recognize includes a request by the thread 702a to write data to its allocation portion of the memory system 212.

Figure 9B:
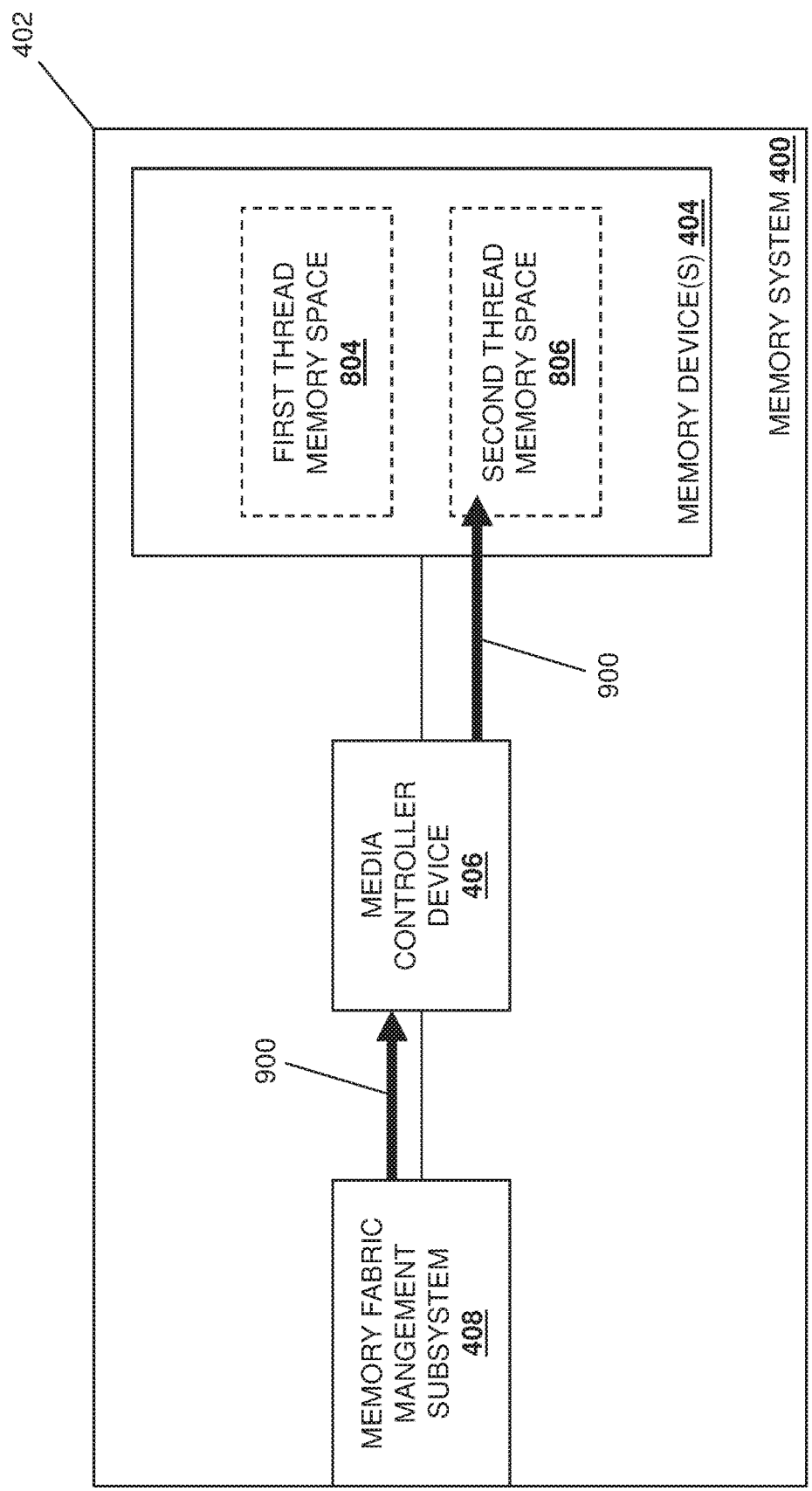
FIG. 9B is a schematic view illustrating an embodiment of the memory system in the networked system of FIG. 2 operating during the method of FIG. 6.

As would be understood by one of skill in the art in possession of the present disclosure, the memory fabric management subsystem 304 in the switch device 208/300 may receive that data load/store communication 900 via its communication subsystem 308, and may utilize information included in that data load/store communication, data in the memory fabric management database 306, and/or any other information that would be apparent to one of skill in the art in possession of the present disclosure in order to provide the data load/store communication 900 in the memory system 212. As such, as illustrated in FIG. 9B, the memory fabric management subsystem 408 in the memory system 400 may receive that data load/store communication 900 and provide it to the media controller device 406, and that media controller device 406 may operate to store data included in the data load/store communication 900 in the second thread memory space 806 that was allocated to the thread 702a at block 604.

Figure 10A:
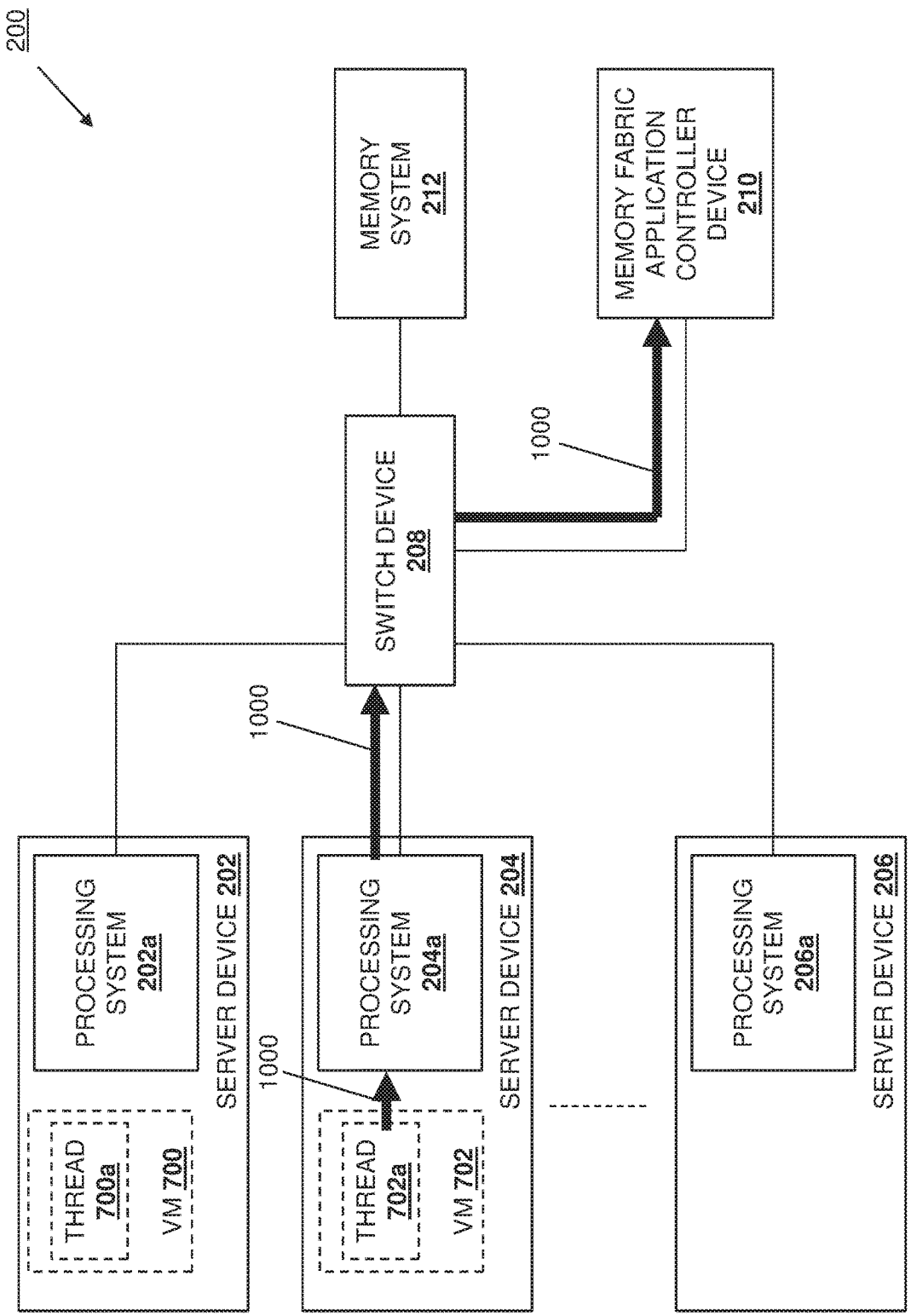
FIG. 10A is a schematic view illustrating an embodiment of the controller-based inter-device notational data movement system in the networked system of FIG. 2 operating during the method of FIG. 6.

The method 600 then proceeds to block 608 where the controller device receives a request from the first thread to transfer data stored in the first portion of the memory system to a second thread. In an embodiment, at block 608, the memory fabric application controller device 210 may operate to receive requests to transfer data transmitted by any thread included in any virtual machine provided by any of the processing systems 202a, 204a, and 206a included in their respective server devices 202, 204, and 206. Continuing with the example provided above and with reference to FIG. 10A, the communication subsystem 308 in the switch device 300 may receive a request 1000 to transfer data that is generated and transmitted by the thread 702a included in the virtual machine 702 provided by the server device 204, and the memory fabric management subsystem 304 in the switch device 208/300 may operate to forward that request 1000 to transfer data to the memory fabric application controller device 210. In some embodiments, the memory fabric management subsystem 304 in the switch device 208/300 may be configured to snoop communications transmitted by any thread included in any virtual machine provided by any of the processing systems 202a, 204a, and 206a included in their respective server devices 202, 204, and 206 in order to identify requests to transfer data. For example, with reference to FIG. 10A, during the process of conventional subsystems in the switch device 300 performing conventional switching operations on the request 1000, the memory fabric management subsystem 304 in the switch device 208/300 may operate to performing snooping operations on the request 1000 to transfer data that was transmitted by the thread 702a in order to identify the request 1000 and forward the request 100 to the memory fabric application controller device 210.

As such, at block 608, the memory fabric application controller engine 504 may receive the request 1000 to transfer data via its communication subsystem 508 and may use that request 1000 to identify the thread 700a to which the data is to-be transferred, data address(es) for the data to-be transferred, data references for the data to-be transferred, and/or any other data transfer information that would be apparent to one of skill in the art in possession of the present disclosure. However, while a specific example of the identification of requests to transfer data have been described, one of skill in the art in possession of the present disclosure will recognize that requests to transfer data may be identified in a variety of manners that will fall within the scope of the present disclosure as well.

Figure 10B:
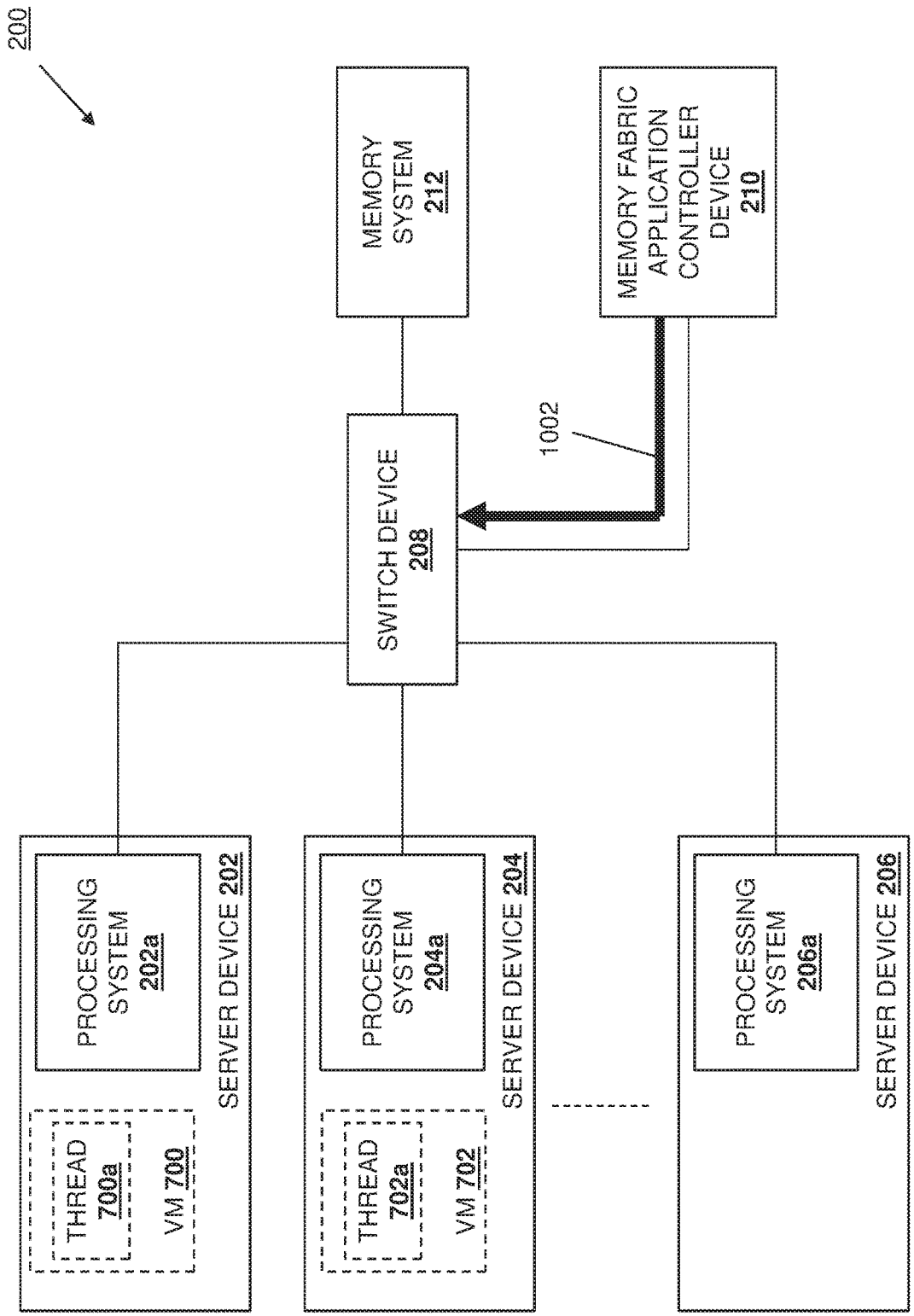
FIG. 10B is a schematic view illustrating an embodiment of the controller-based inter-device notational data movement system in the networked system of FIG. 2 operating during the method of FIG. 6.
Figure 10C:
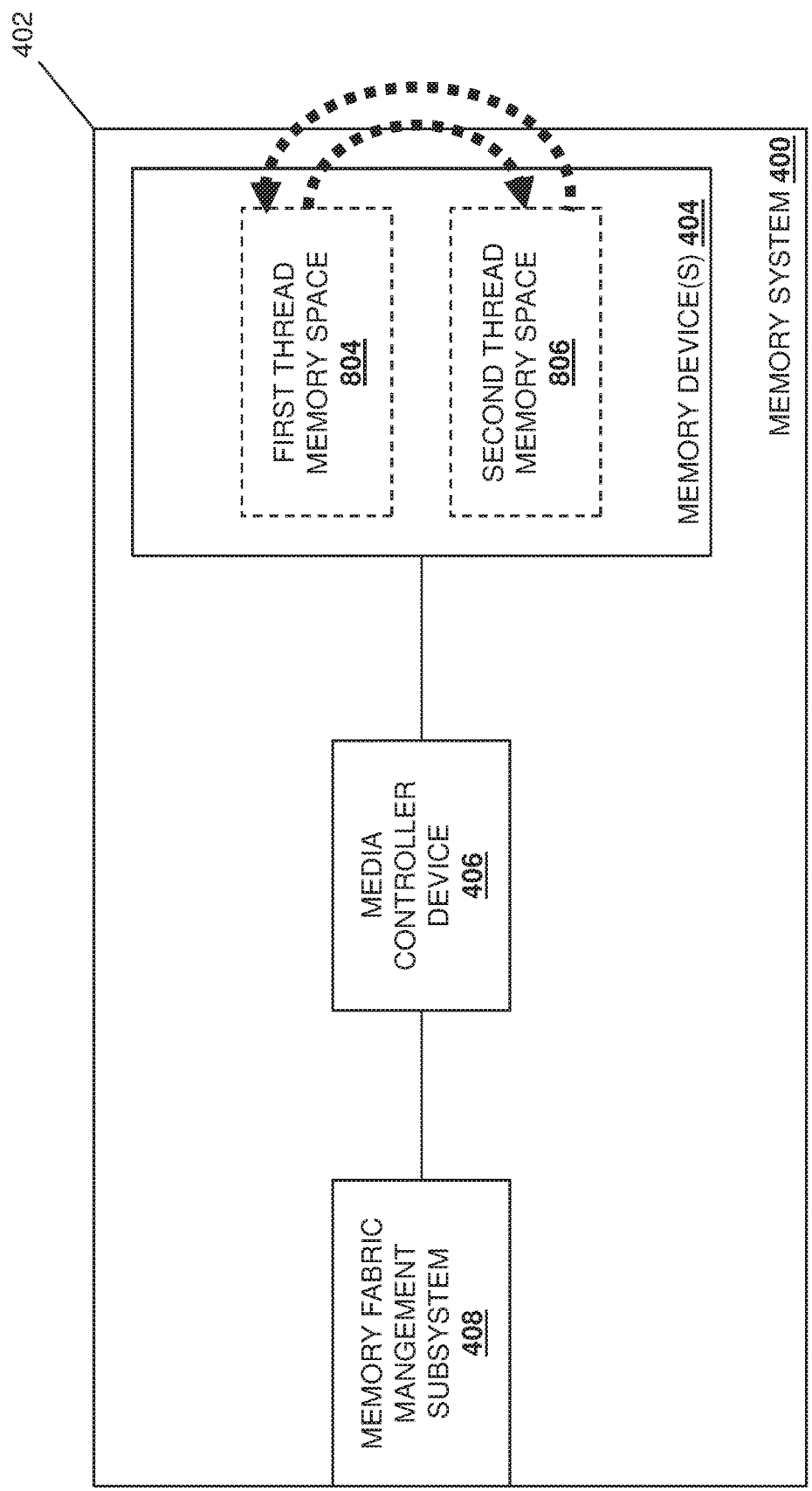
FIG. 10C is a schematic view illustrating an embodiment of the memory system in the networked system of FIG. 2 operating during the method of FIG. 6.

The method 600 then proceeds to block 610 where the controller device modifies notational reference information to disassociate a first portion of the memory system and the first thread, and associate the first portion of the memory system with the second thread. In an embodiment, at block 610, the memory fabric application controller engine 504 in the memory fabric application controller device 210/500 may access the memory fabric management database 306 in order to perform notational reference information modification operations 1002 in the switch memory fabric management database 306, as illustrated in FIG. 10B. In an embodiment, the notational reference information modification operations 1002 may be performed on the notational reference information that is associated with the memory system portion allocations and that was stored in the memory fabric management database 306 at block 602 which, as discussed above, may include reference pointers that map the thread 700a to the first thread memory space 804 in the memory device(s) 404 included in the memory system 212/400 and that map the thread 702a to the second thread memory space 806 in the memory device(s) 404 included in the memory system 212/400, page ownership information that provides the thread 700a ownership of the first thread memory space 804 in the memory device(s) 404 included in the memory system 212/400 and that provides the thread 702a ownership of the second thread memory space 806 in the memory device(s) 404 included in the memory system 212/400, and/or any other notational reference information that would be recognized by one of skill in the art in possession of the present disclosure as providing for the allocation of portions of the memory fabric memory system to threads.

For example, at block 610, the modification of the notational reference information in the memory fabric management database 306 in the switch device 208/300 may include the memory fabric application controller engine 504 in the memory fabric application controller device 210/500 disassociating the thread 702a from the second thread memory space 806 that it was allocated in the memory device(s) 404 included in the memory system 212/400 at block 602, and associating the thread 700a with the second thread memory space 806 in the memory device(s) 404 included in the memory system 212/400. In a specific example, the disassociation of the thread 702a from the second thread memory space 806 and the association of the thread 700a with the second thread memory space 806 may include changing a reference pointer that maps the thread 702a to the second thread memory space 806 such that that reference pointer maps the thread 700a to the second thread memory space 806, and changing page ownership information that provides the thread 702a ownership of the second thread memory space 806 such that the thread 700a owns the second thread memory space 806. However, while specific notation reference information modification operations have been described, one of skill in the art in possession of the present disclosure will recognize that the second thread memory space 806 may be disassociated with the thread 702a and associated with the thread 800a in a variety of manners that will fall within the scope of the present disclosure as well.

The method 600 proceeds to block 612 where the controller device modifies notational reference information to disassociate a second portion of the memory system and the second thread, and associate the second portion of the memory system with the first thread. In an embodiment, at block 612, the modification of the notational reference information in the switch memory fabric management database 306 may include the memory fabric application controller engine 504 in the memory fabric application controller device 210/500 disassociating the thread 700a from the first thread memory space 804 that it was allocated in the memory device(s) 404 included in the memory system 212/400 at block 602, and associating the thread 702a with the first thread memory space 804 in the memory device(s) 404 included in the memory system 212/400. In a specific example, the disassociation of the thread 700a from the first thread memory space 804 and the association of the thread 702a with the first thread memory space 804 may include changing a reference pointer that maps the thread 700a to the first thread memory space 804 such that that reference pointer maps the thread 702a to the first thread memory space 804, and changing page ownership information that provides the thread 700a ownership of the first thread memory space 804 such that the thread 702a owns the first thread memory space 804. However, while specific notation reference information modification operations have been described, one of skill in the art in possession of the present disclosure will recognize that the first thread memory space 804 may be disassociated with the thread 700a and associated with the thread 702a in a variety of manners that will fall within the scope of the present disclosure as well.

As will be appreciated by one of skill in the art in possession of the present disclosure, the notation reference information modification performed at block 610 and 612 may be performed at substantially the same time and/or as part of similar operations such that the first thread memory space 804 and the second thread memory space 806 in the memory device(s) 404 in the memory system have their allocations (i.e., to the threads 700a and 702a, respectively) "swapped", as illustrated in FIG. 100 (which one of skill in the art in possession of the present disclosure will recognize is accomplished entirely by the modifications of the notational reference information in the memory fabric management database 306, and does not require data movement actions to be performed within the memory system 212/400.) As such, blocks 610 and 612 may provide for the swapping of reference pointers in the switch memory fabric management database 306 that map the thread 700a to the first thread memory space 804 and that map the thread 702a to the second thread memory space 806 such that the thread 700a is mapped to the second thread memory space 806 and the thread 702a is mapped to the first thread memory space 804, and the swapping of page ownership information that provides the thread 700a ownership of the first thread memory space 804 and that provides the thread 702a ownership of the second thread memory space 806 such that the thread 700a owns the second thread memory space 804 and the thread 702a owns the first thread memory space 804.

In many embodiments, the portions of the memory system 212/400 being swapped may be equal sized portions of the memory system 212/400 so that the first thread transferring data to the second thread does not lose allocated memory as a result of the method 600. As such, the first thread memory space 804 may be equal in size to the second thread memory space 806 so that the thread 702a does not lose allocated memory in the "transfer" of the data in the second thread memory space 806 to the thread 700a. In some embodiments, the portion of memory allocated to the second thread that is provided to the first thread that is "transferring" the data during the method 600 may be selected to have the same size as the portion of the memory allocated to the first thread that stores that data prior to "transfer" (e.g., the second thread memory space 806 in the example above). As such, the first thread memory space 804 may be identified during the method 600 for reallocation to the thread 702a based on it being currently allocated to the thread 700a and having a size that is equal to the second thread memory space 806 that stores the data being "transferred" at the request of the thread 702a. However, while a specific example of the swapping of memory space allocations having equal sizes has been described, one of skill in the art in possession of the present disclosure will recognize that different sized memory spaces may be swapped in other embodiments. Furthermore, in some embodiments, block 612 may be skipped such that the first thread (e.g., the thread 702a in the examples below) ends up losing allocated memory as part of the notational reference information modification data "transfer".

Figure 11A:
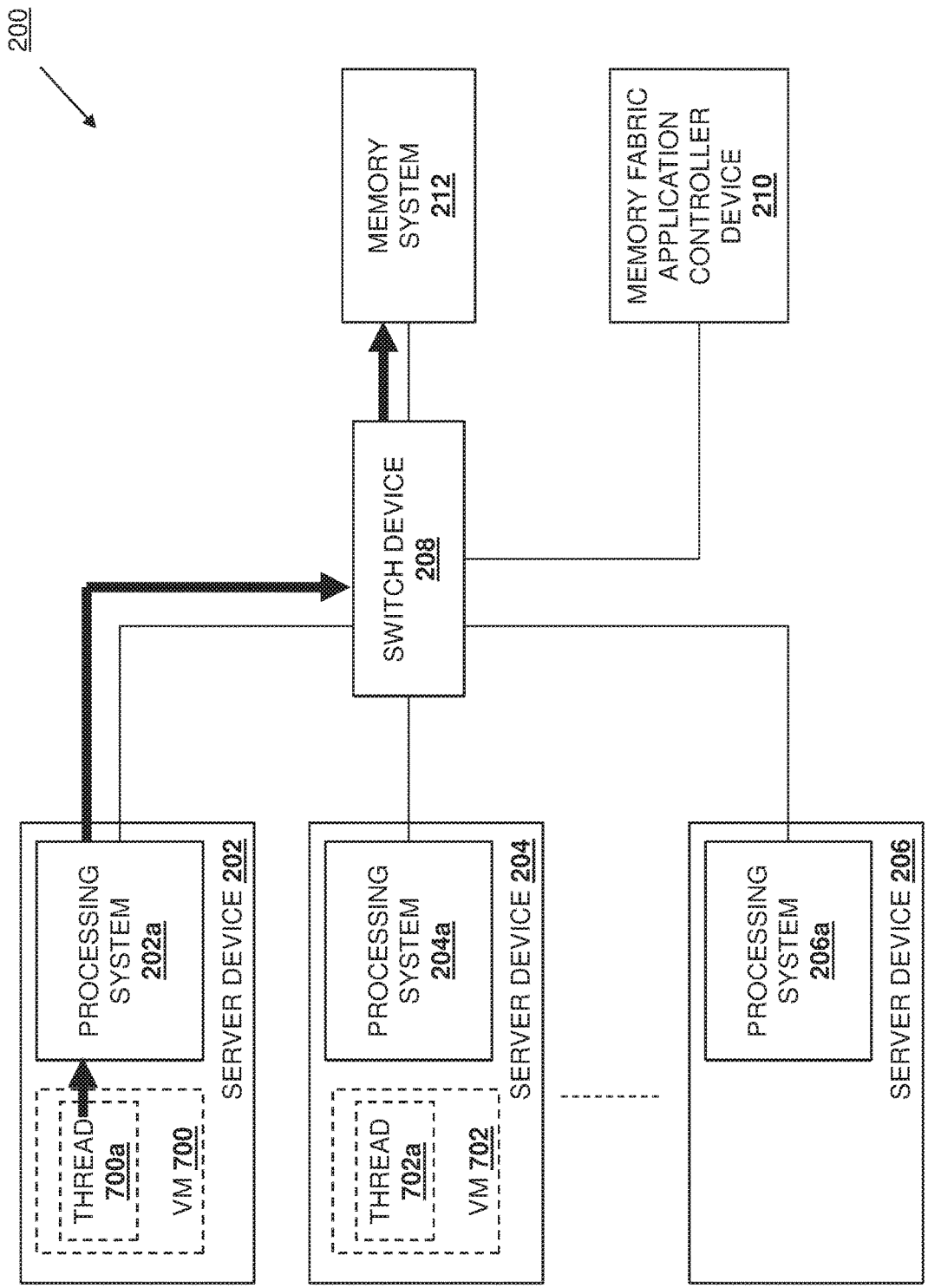
FIG. 11A is a schematic view illustrating an embodiment of the controller-based inter-device notational data movement system in the networked system of FIG. 2 operating during the method of FIG. 6.
Figure 11B:
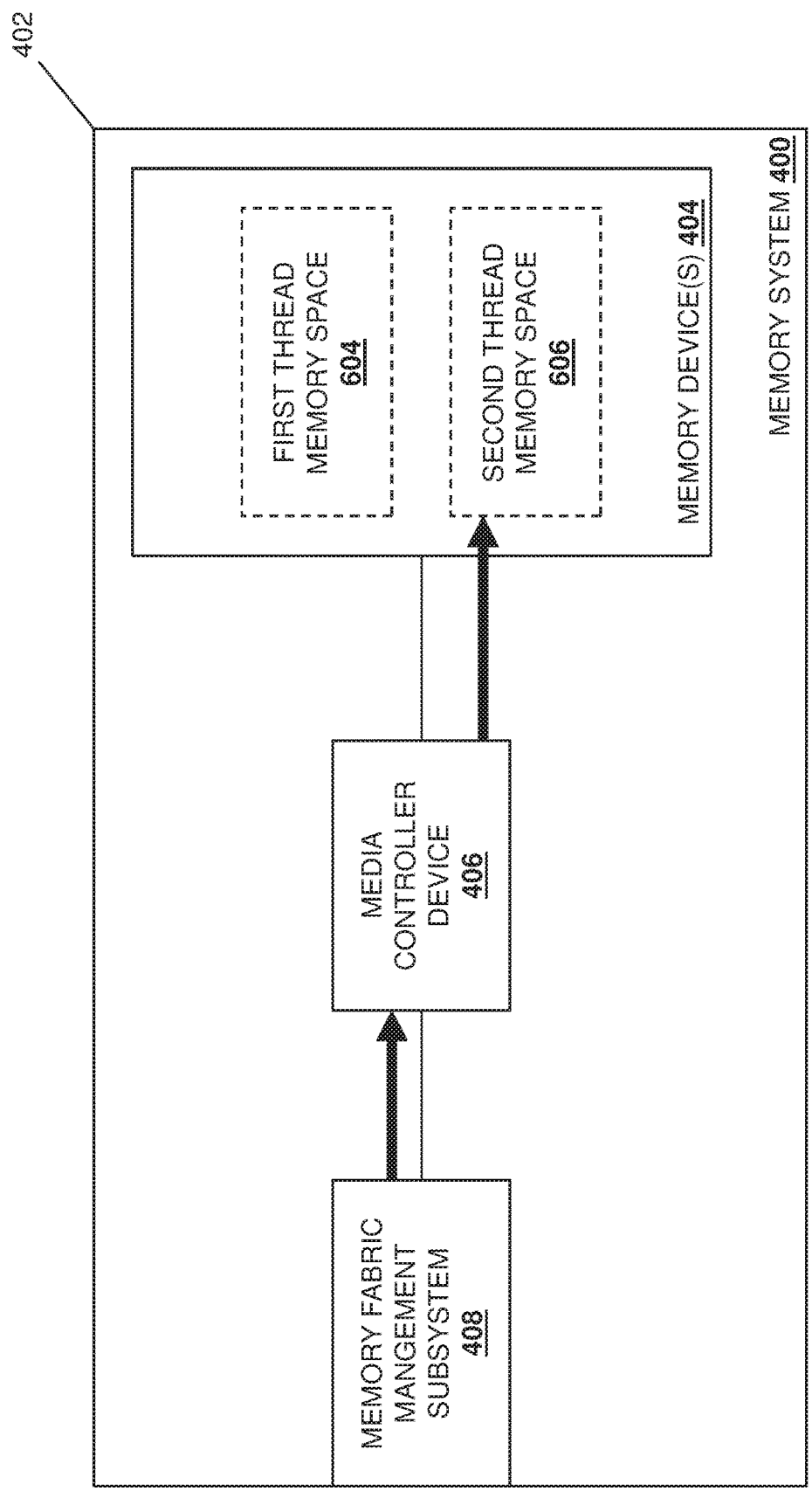
FIG. 11B is a schematic view illustrating an embodiment of the memory system of FIG. 4 operating during the method of FIG. 6.
Figure 11C:
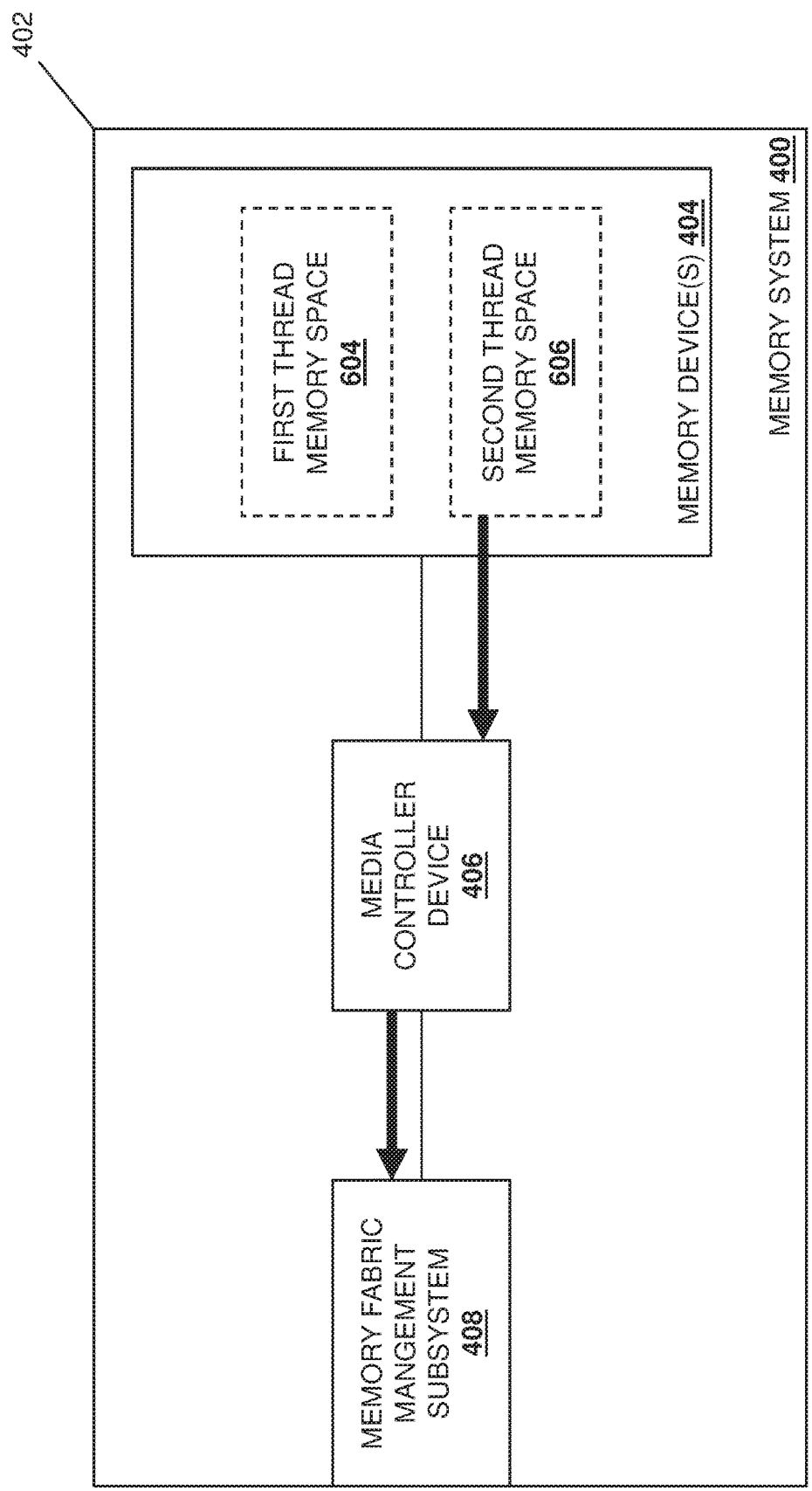
FIG. 11C is a schematic view illustrating an embodiment of the memory system of FIG. 4 operating during the method of FIG. 6.
Figure 11D:
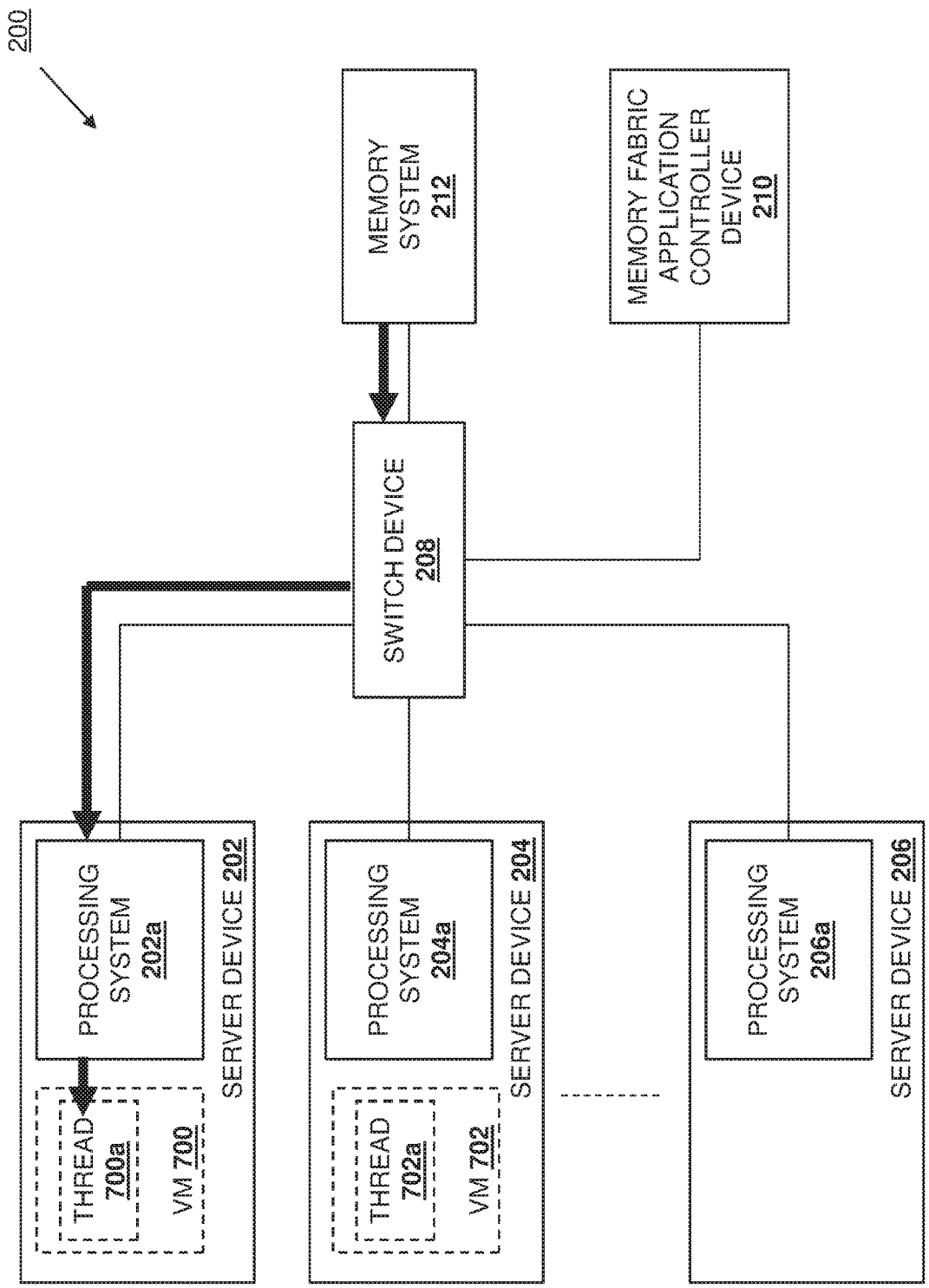
FIG. 11D is a schematic view illustrating an embodiment of the controller-based inter-device notational data movement system in the networked system of FIG. 2 operating during the method of FIG. 6.

The method 600 proceeds to block 614 where the second thread accesses data in the first portion of the memory system. In an embodiment, at block 614, the thread 700a may now access the data in the second thread memory space 806 via, for example, request/respond operations. FIG. 11A illustrates the thread 700a generating and transmitting a memory load instruction via the processing system 202a in the server device 202 and through the switch device 208 such that it is received by the memory fabric management subsystem 304 in the switch device 208/300 (e.g., via the communication subsystem 308), with that memory load instruction requesting the data "transferred" by the thread 702a as discussed above. The switch memory fabric management subsystem 304 may then act as a memory fabric requester (e.g., a Gen-Z requester) and utilize the notation reference information in the switch memory fabric management database 306 to generate a memory fabric request (e.g., a Gen-Z request) that is transmitted via the communication subsystem 308 to the memory system 212. As illustrated in FIGS. 11B and 11O, the memory fabric management subsystem 408 may act as a memory fabric responder (e.g., a Gen-Z responder) and retrieve the data via the media controller device 406 and from the second thread memory space 606 in the memory device(s) 404, generate a memory fabric response (e.g., a Gen-Z response) that includes the data retrieved from the second thread memory space 806 as its payload, and transmit that memory fabric response through the switch device 208. FIG. 11D illustrates how the memory fabric management subsystem 304 in the switch device 208/300 may receive the memory fabric response and act as a memory fabric requester to load the data retrieved from the second thread memory space 806 in a local memory system provided for the virtual machine 700 and accessible to the thread 700a. However, while a specific example of the accessing of data in the first portion of the memory system by the second thread has been described, one of skill in the art in possession of the present disclosure will recognize that data transferred via the notational reference information modifications described herein may be accessed in a variety of manners that will fall within the scope of the present disclosure as well.

Thus, systems and methods have been described that provide for the "transfer" of data, while avoiding the need to read, write, copy, and/or perform other conventional data transfer operations that actually move data between memory fabric address spaces, by changing the allocations of portions of a memory system in a memory fabric between a thread that requests to transfer that data and a thread to which the transfer of that data is requested. As such, a first thread included in a first virtual machine provided by a first processing system in a first server device may request to transfer data to a second thread included in a second virtual machine provided by a second processing system in a second server device, and a controller device coupled to a switch device that couples those server devices to a memory fabric memory system may identify that request to transfer data. In response, the controller device may modify notational reference information in a database in the switch device in order to swap a first portion of the memory fabric memory system that is allocated to the first thread and that stores the data to-be transferred with some equal sized portion of the memory fabric memory system that is allocated to the second thread, which allows the second thread to reference the data in the first portion of the memory fabric memory system using request/respond operations. As such, more efficient inter-device memory-fabric-based data transfers are provided that eliminate the need to perform conventional data transfer operations that actually move the data between memory fabric address spaces, while providing the effect of such data movement by notational reference modifications that reallocate portions of the memory fabric.

Furthermore, the present disclosure is being filed along with U.S. patent application Ser. No. 16/396,140, filed on Apr. 26, 2019, and directed to switch-based inter-device notational data movement techniques; and U.S. patent application Ser. No. 16/396,433, filed on Apr. 26, 2019, and directed to intra-device notational data movement techniques; each of which include embodiments that utilize notational data movement systems similar to those described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A switch-based inter-device notational data movement system, comprising:
    a first processing system that is included in a first chassis and that is configured to provide a first thread;
    a second processing system that is included in a second chassis and that is configured to provide a second thread;
    a memory system;
    a switch device that couples the first processing system and the second processing system to the memory system; and
    a controller device that is coupled to the switch device and configured to:
        receive, in a data transfer communication transmitted by the first thread, a request to transfer data to the second thread, wherein the data is stored in a first portion of the memory system that is associated with the first thread in a memory fabric management database included in the switch device; and
        modify, in the memory fabric management database, notational reference information in order to disassociate the first portion of the memory system and the first thread and associate the first portion of the memory system with the second thread, wherein the association of the first portion of the memory system with the second thread allows the second thread to reference the data using request/respond operation.

2. The system of claim 1, wherein the controller device is configured to:
    receive, in a memory allocation request communication transmitted by the first thread, a request to allocate memory to the first thread; and
    allocate, in the memory fabric management database included in the switch device, the first portion of the memory system to the first thread, wherein the allocation of the first portion of the memory system to the first thread allows the first thread to reference data in the first portion of the memory system using request/respond operation.

3. The system of claim 2, wherein the switch device is configured to:
    receive, in a data storage request communication transmitted by the first thread, a request to store data in the memory system; and
    store, based on the allocation of the first portion of the memory system to the first thread in the memory fabric management database included in the switch device, the data in the first portion of the memory system.

4. The system of claim 1, wherein the controller device is configured to:
    modify, in the memory fabric management database included in the switch device, the notational reference information in order to disassociate a second portion of the memory system and the second thread and associate the second portion of the memory system with the first thread.

5. The system of claim 4, wherein the first portion of the memory system and the second portion of the memory system are the same size.

6. The system of claim 4, wherein the disassociation of the first portion of the memory system and the first thread, the association of the first portion of the memory system with the second thread, the disassociation of the second portion of the memory system and the second thread, and the association of the second portion of the memory system with the first thread includes:

swapping reference pointers that map the first thread to the first portion of the memory system and that map the second thread to the second portion of the memory system; and swapping page ownership that provides the first thread ownership of the first portion of the memory system and that provides the second thread ownership of the second portion of the memory system such that the second thread owns the first portion of the memory system and the first thread owns the second portion of the memory system.

7. An Information Handling System (IHS), comprising:

a processing system; and a memory system that is coupled to the processing system and that includes instructions that, when executed by the processing system, cause the processing system to provide a memory fabric application controller engine that is configured to:

receive, in a data transfer communication transmitted by a first thread that is provided by a first processing system that is included in a first chassis, a request to transfer data to a second thread that is provided by a second processing system that is included in a second chassis, wherein the data is stored in a first portion of the memory system that is associated with the first thread in a memory fabric management database that is included in a switch device that couples the first processing system and the second processing system to the memory system; and modify, in the memory fabric management database included in the switch device, notational reference information in order to disassociate the first portion of the memory system and the first thread and associate the first portion of the memory system with the second thread, wherein the association of the first portion of the memory system with the second thread allows the second thread to reference the data using request/respond operation.

8. The IHS of claim 7, wherein the memory fabric application controller engine is configured to:

receive, in a memory allocation request communication transmitted by the first thread, a request to allocate memory to the first thread; and allocate, in the memory fabric management database included in the switch device, the first portion of the memory system to the first thread, wherein the allocation of the first portion of the memory system to the first thread allows the first thread to reference data in the first portion of the memory system using request/ respond operation.

9. The IHS of claim 8, wherein the memory fabric application controller engine is configured to:

transmit, to the first thread in response to allocating the first portion of the memory system to the first thread, a memory allocation response communication.

10. The IHS of claim 7, wherein the memory fabric application controller engine is configured to:

modify, in the memory fabric management database included in the switch device, the notational reference information in order to disassociate a second portion of the memory system and the second thread and associate the second portion of the memory system with the first thread.

11. The IHS of claim 10, wherein the first portion of the memory system and the second portion of the memory system are the same size.

12. The IHS of claim 10, wherein the disassociation of the first portion of the memory system and the first thread, the association of the first portion of the memory system with the second thread, the disassociation of the second portion of the memory system and the second thread, and the association of the second portion of the memory system with the first thread includes:

swapping reference pointers that map the first thread to the first portion of the memory system and that map the second thread to the second portion of the memory system.

13. The IHS of claim 10, wherein the disassociation of the first portion of the memory system and the first thread, the association of the first portion of the memory system with the second thread, the disassociation of the second portion of the memory system and the second thread, and the association of the second portion of the memory system with the first thread includes:

swapping page ownership that provides the first thread ownership of the first portion of the memory system and that provides the second thread ownership of the second portion of the memory system such that the second thread owns the first portion of the memory system and the first thread owns the second portion of the memory system.

14. A method for providing switch-based inter-device notational data movement, comprising:

receiving, by a controller device in a data transfer communication transmitted by a first thread that is provided by a first processing system that is included in a first chassis, a request to transfer data to a second thread that is provided by a second processing system that is included in a second chassis, wherein the data is stored in a first portion of a memory system that is associated with the first thread in a memory fabric management database that is included in a switch device that couples the first processing system and the second processing system to the memory system; and modifying, by the controller device in the memory fabric management database included in the switch device, notational reference information in order to disassociate the first portion of the memory system and the first thread and associate the first portion of the memory system with the second thread, wherein the association of the first portion of the memory system with the second thread allows the second thread to reference the data using request/respond operation.

15. The method of claim 14, further comprising:

receiving, by the controller device in a memory allocation request communication transmitted by the first thread, a request to allocate memory to the first thread; and allocating, by the controller device in the memory fabric management database included in the switch device, the first portion of the memory system to the first thread, wherein the allocation of the first portion of the memory system to the first thread allows the first thread to reference data in the first portion of the memory system using request/respond operation.

16. The method of claim 15, further comprising:
transmitting, by the controller device to the first thread in response to allocating the first portion of the memory system to the first thread, a memory allocation response communication.

17. The method of claim 14, further comprising:
modifying, by the controller device in the memory fabric management database included in the switch device, the notational reference information in order to disassociate a second portion of the memory system and the second thread and associate the second portion of the memory system with the first thread.

18. The method of claim 17, wherein the first portion of the memory system and the second portion of the memory system are the same size.

19. The method of claim 17, wherein the disassociation of the first portion of the memory system and the first thread, the association of the first portion of the memory system with the second thread, the disassociation of the second portion of the memory system and the second thread, and the association of the second portion of the memory system with the first thread includes:
swapping reference pointers that map the first thread to the first portion of the memory system and that map the second thread to the second portion of the memory system.

20. The method of claim 17, wherein the disassociation of the first portion of the memory system and the first thread, the association of the first portion of the memory system with the second thread, the disassociation of the second portion of the memory system and the second thread, and the association of the second portion of the memory system with the first thread includes:
swapping page ownership that provides the first thread ownership of the first portion of the memory system and that provides the second thread ownership of the second portion of the memory system such that the second thread owns the first portion of the memory system and the first thread owns the second portion of the memory system.

* * * * *